United States Patent
Rho et al.

(10) Patent No.: US 12,554,222 B2
(45) Date of Patent: Feb. 17, 2026

(54) STIMULUS-RESPONSIVE DYNAMIC META-HOLOGRAPHIC DEVICE

(71) Applicant: POSTECH, Gyeongsangbuk-do (KR)

(72) Inventors: Jun Suk Rho, Pohang-si (KR); In Ki Kim, Gimpo-si (KR); Won Sik Kim, Gwangju (KR); Young Ki Kim, Pohang-si (KR); Jae Hyuck Jang, Goyang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 190 days.

(21) Appl. No.: 18/279,265

(22) PCT Filed: Jan. 3, 2022

(86) PCT No.: PCT/KR2022/000025
§ 371 (c)(1),
(2) Date: Aug. 29, 2023

(87) PCT Pub. No.: WO2022/186464
PCT Pub. Date: Sep. 9, 2022

(65) Prior Publication Data
US 2024/0061376 A1    Feb. 22, 2024

(30) Foreign Application Priority Data

Mar. 3, 2021    (KR) .................. 10-2021-0028038
Mar. 10, 2021   (KR) .................. 10-2021-0031579

(51) Int. Cl.
*G03H 1/26*    (2006.01)
*G03H 1/08*    (2006.01)
(Continued)

(52) U.S. Cl.
CPC ............. *G03H 1/26* (2013.01); *G03H 1/0891* (2013.01); *G03H 1/16* (2013.01);
(Continued)

(58) Field of Classification Search
CPC ....... H04N 9/3105; H04N 9/3197; H04N 5/74; H04N 9/3135; H04N 9/3155;
(Continued)

(56) References Cited

U.S. PATENT DOCUMENTS 10,968,522 B2    4/2021   Akselrod et al.
11,169,311 B2    11/2021  Rubin et al.
(Continued)

FOREIGN PATENT DOCUMENTS

KR   10-2017-0015109   2/2017
KR   10-2019-0084099   7/2019
(Continued)

OTHER PUBLICATIONS

Inki Kim et al., ("Stimuli-Responsive Dynamic Metaholographic Displays with Designer Liquid Crystal Modulators", Advanced Materials 32.50 (2020): 2004664, Nov. 10, 2020, listed in IDS) (Year: 2020).*

Inki Kim et al., "Stimuli-Responsive Dynamic Metaholographic Displays with Designer Liquid Crystal Modulators", Advanced Materials 32.50 (2020): 2004664, Nov. 10, 2020.

(Continued)

*Primary Examiner* — Masum Billah
(74) *Attorney, Agent, or Firm* — LEX IP MEISTER, PLLC

(57) ABSTRACT

This disclosure relates to a stimulus-responsive dynamic meta-holographic device. According to an aspect of the disclosure, a stimulus-responsive dynamic meta-holographic device can be provided, which includes a metasurface in which a plurality of nanostructures are provided; wherein in the metasurface is provided a liquid crystal layer comprising a plurality of cells that may be altered in arrangements by outer stimulus, wherein the liquid crystal layer, is configured to alter the polarization state of the transmitted beam penetrating the liquid crystal layer as the arrangements of the cells are altered by outer stimulus.

15 Claims, 27 Drawing Sheets

(51) Int. Cl.
  *G03H 1/16* (2006.01)
  *G03H 1/00* (2006.01)
  *G03H 1/02* (2006.01)
  *G03H 1/04* (2006.01)
(52) U.S. Cl.
  CPC ............... *G03H 2001/0088* (2013.01); *G03H 2001/0212* (2013.01); *G03H 2001/0458* (2013.01); *G03H 2001/267* (2013.01)
(58) Field of Classification Search
  CPC ............... H04N 9/3161; H04N 9/3141; H04N 9/3188; H04N 9/3194
  USPC .......................................................... 348/40
  See application file for complete search history.

(56) References Cited

U.S. PATENT DOCUMENTS 11,268,854 B2    3/2022  Han et al.
2018/0143470 A1*  5/2018  Oh .................... G02F 1/133711

FOREIGN PATENT DOCUMENTS

| KR | 10-2020-0108901 | 9/2020 |
| KR | 10-2020-0128178 | 11/2020 |
| WO | 2018093730 | 5/2018 |
| WO | 2020/252585 | 12/2020 |

OTHER PUBLICATIONS

Haoran Ren et al., "Complex-amplitude metasurface-based orbital angular momentum holography in momentum space", Nature Nanotechnology 15.11 (2020), doi: 10.1038/s41565-020-0768-4, Sep. 21, 2020.
KIPO, PCT Search Report of PCT/KR2022/000025 dated May 2, 2022.
Bernhard Atorf et al., "All-optical switching of a dye-doped liquid crystal plasmonic metasurface," Optics Express, vol. 28, No. 6, p. 8898, Mar. 2020, doi: https://doi.org/10.1364/oe.383877.
Yueqiang Hu et al., "All-dielectric metasurfaces for polarization manipulation: principles and emerging applications," Nanophotonics, vol. 9, No. 12, pp. 3755-3780, Jun. 2020, doi: https://doi.org/10.1515/nanoph-2020-0220.
Mukesh Sharma et al., "An All-Optically Controlled Liquid-Crystal Plasmonic Metasurface Platform," Laser & Photonics Reviews, vol. 14, No. 11, p. 2000253, Sep. 2020, doi: https://doi.org/10.1002/lpor.202000253.
Fu Liu et al., "Programmable Metasurfaces: State of the Art and Prospects", ISCAS 2018, May 30, 2018.
Hongqiang Zhou et al., "Polarization-Encrypted Orbital Angular Momentum Multiplexed Metasurface Holography," ACS Nano, vol. 14, No. 5, pp. 5553-5559, Apr. 2020, doi: https://doi.org/10.1021/acsnano.9b09814.
Haoran Ren et al., "Metasurface orbital angular momentum holography," Nature Communications, vol. 10, No. 1, Jul. 2019, doi: https://doi.org/10.1038/s41467-019-11030-1.

* cited by examiner

[FIG. 1]
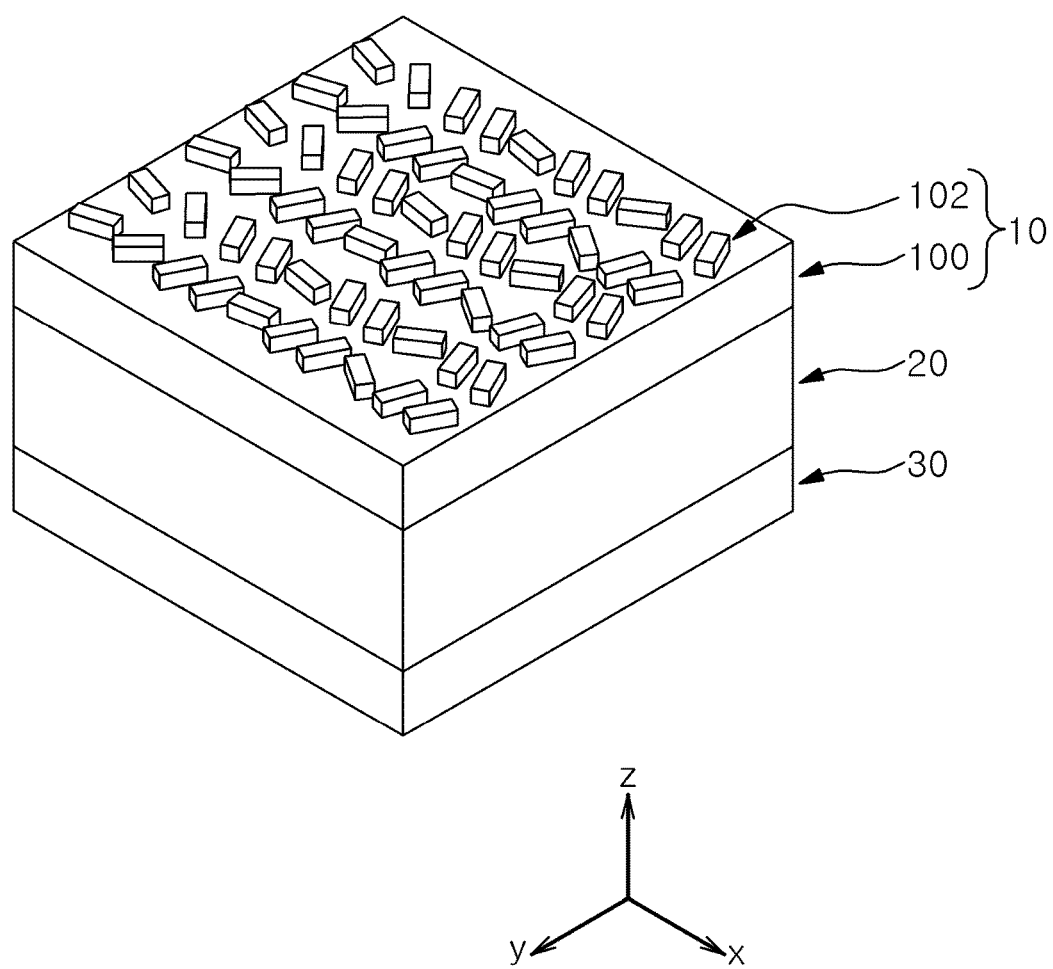

[FIG. 2]
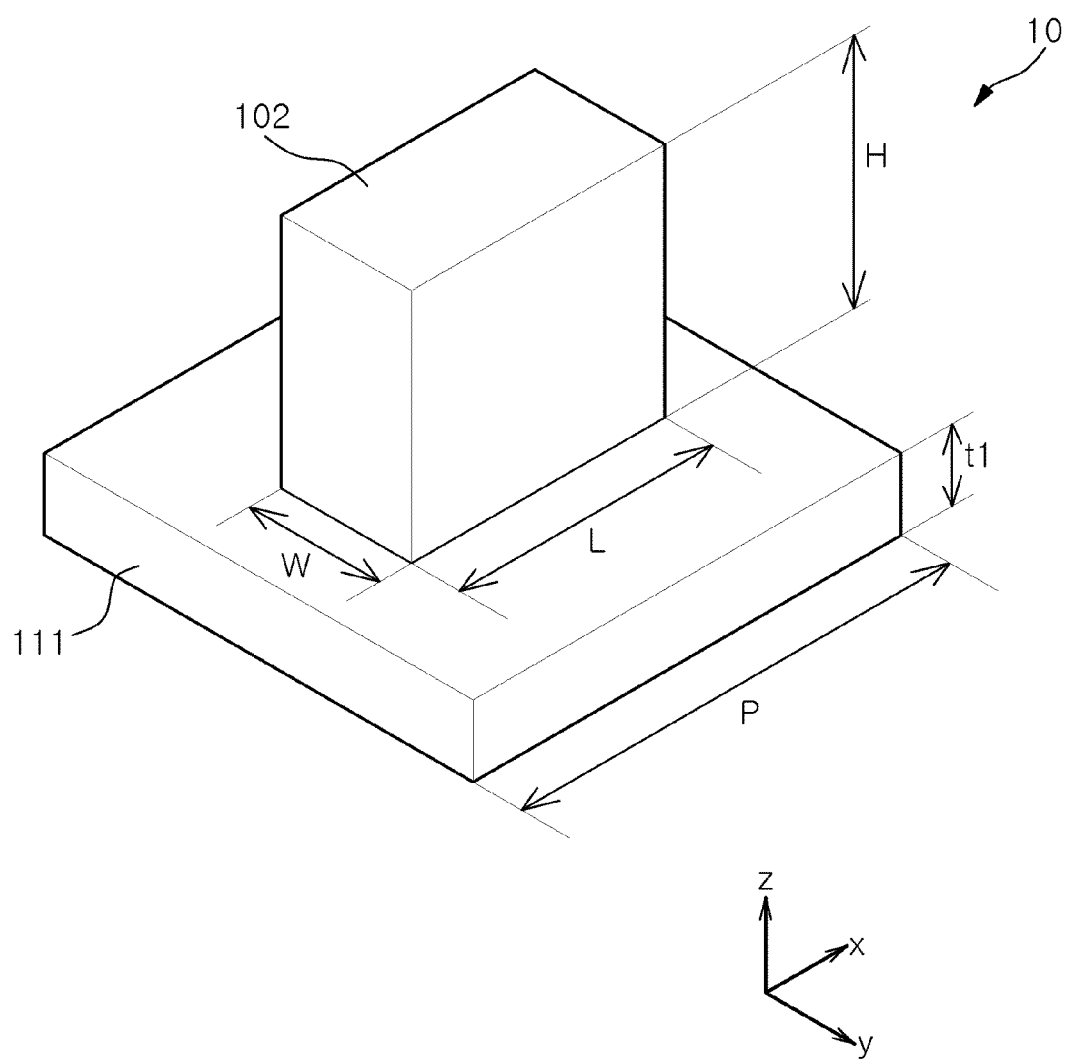

[FIG. 3]
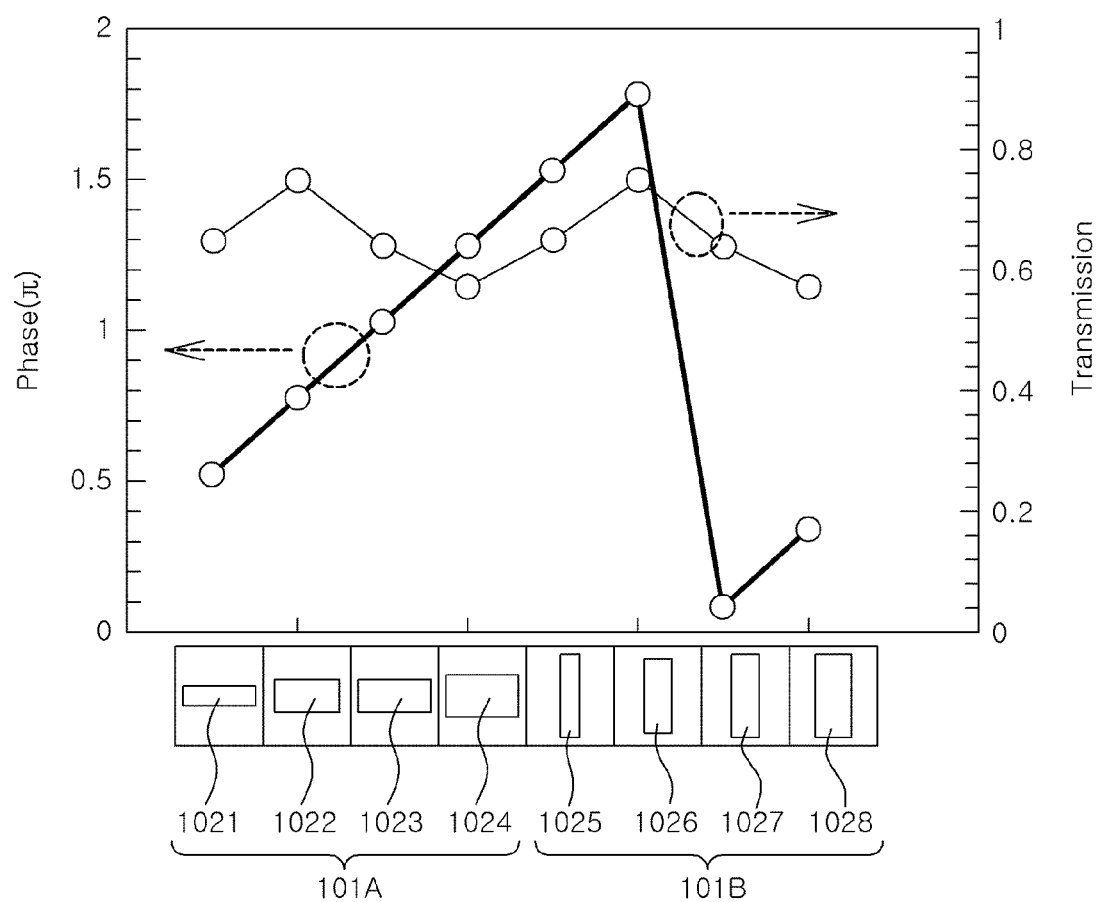

[FIG. 4]
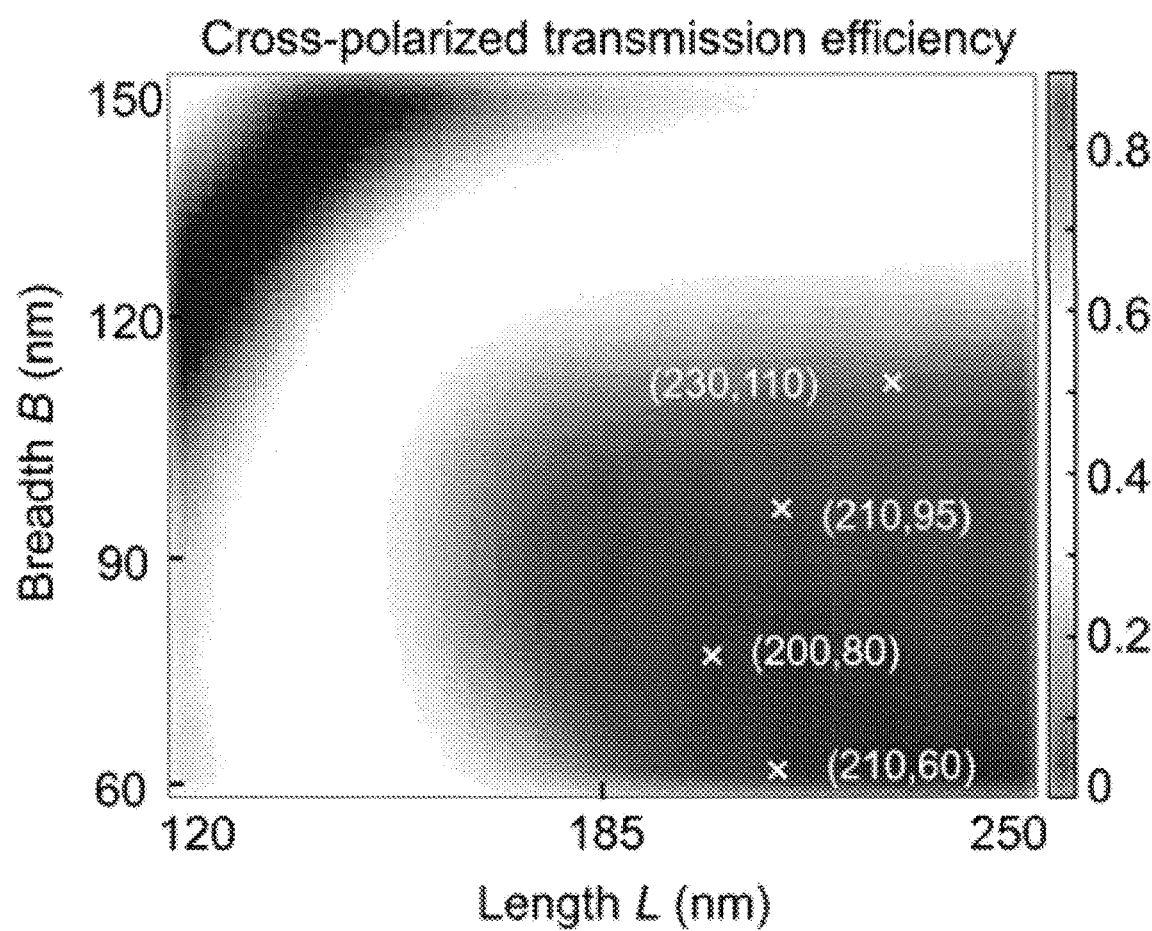

[FIG. 5]
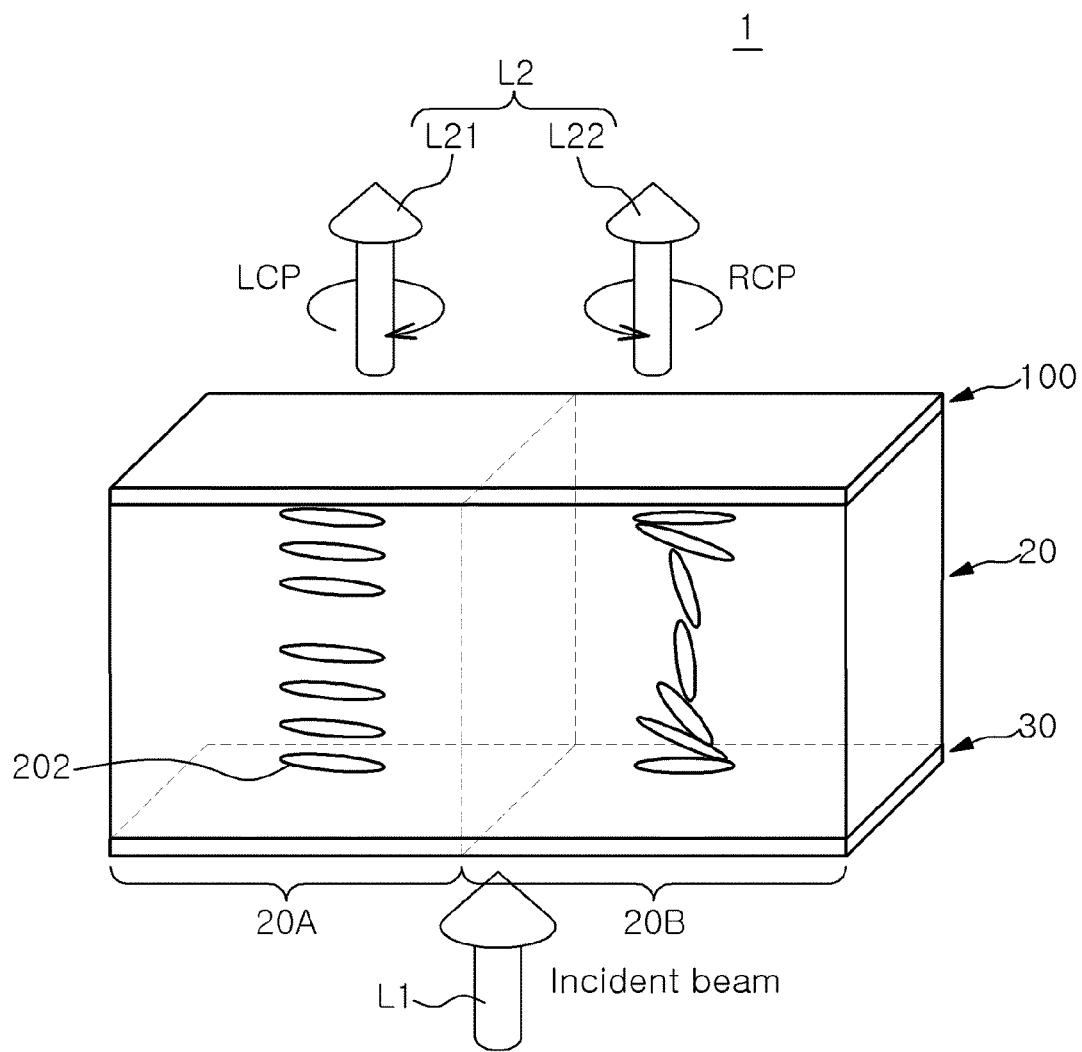

[FIG. 6]
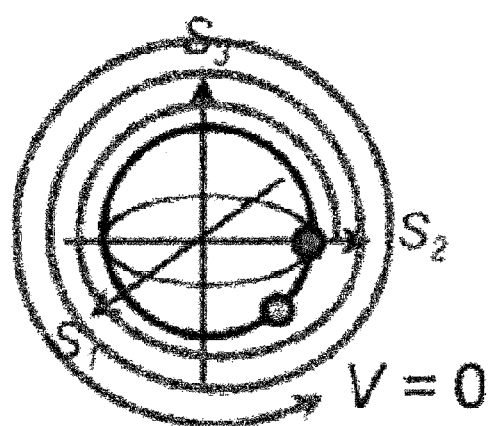

[FIG. 7]
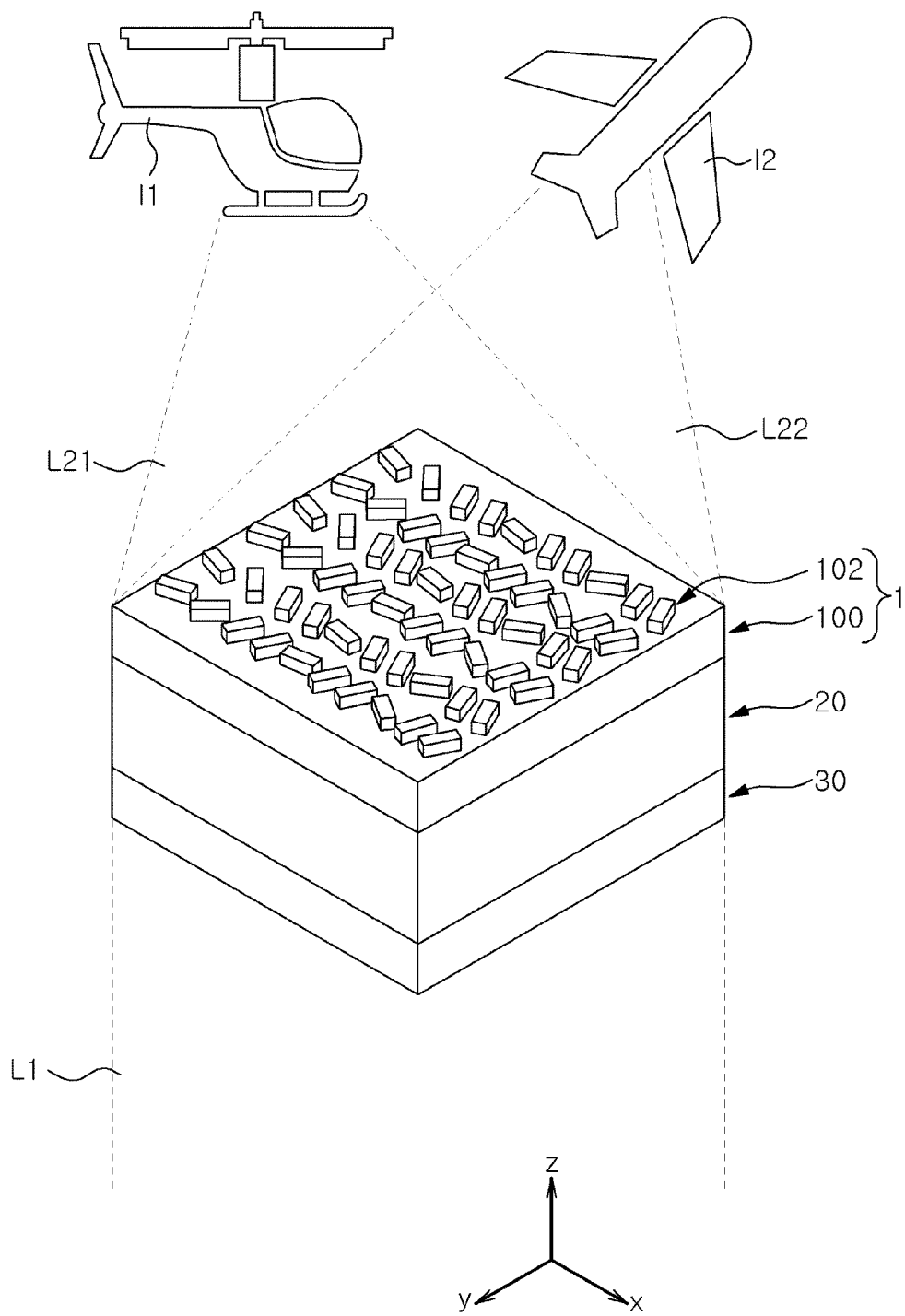

[FIG. 8]
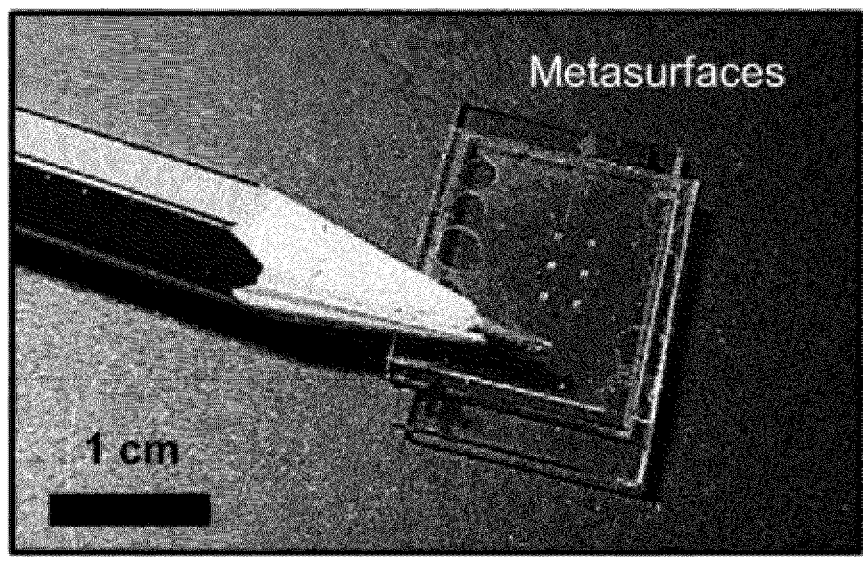
[FIG. 9]
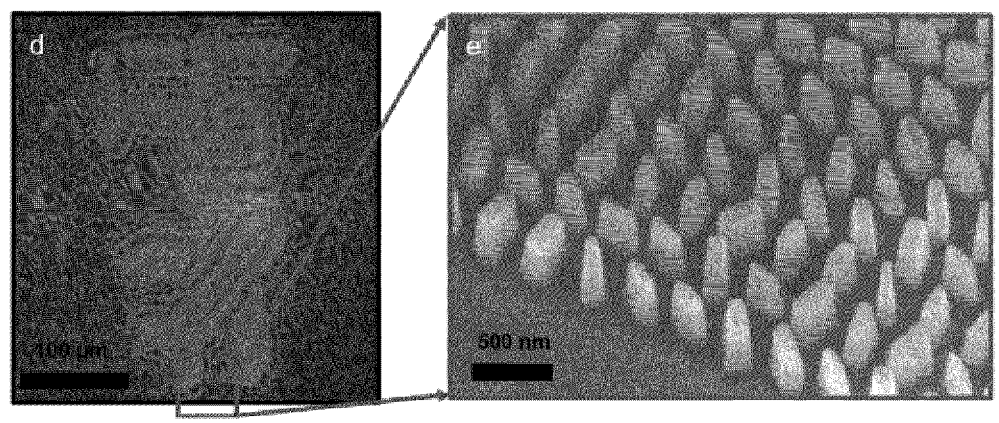

[FIG. 10]
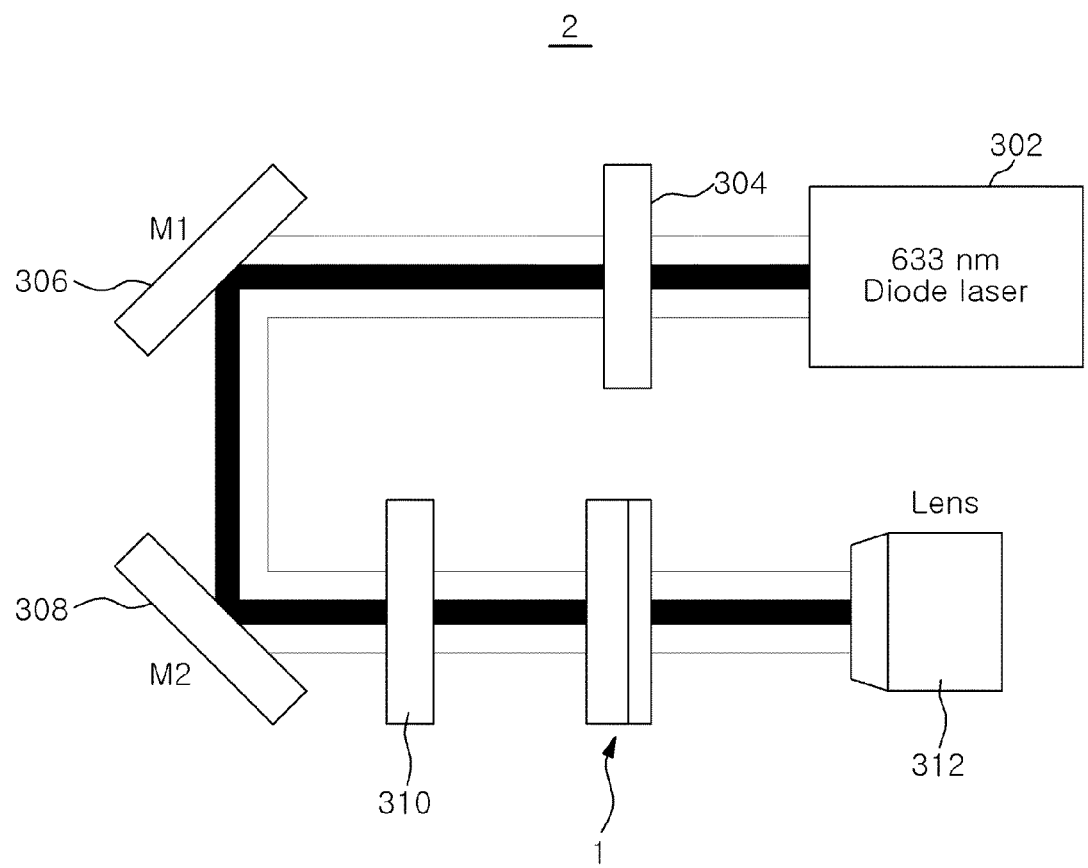

[FIG. 11]
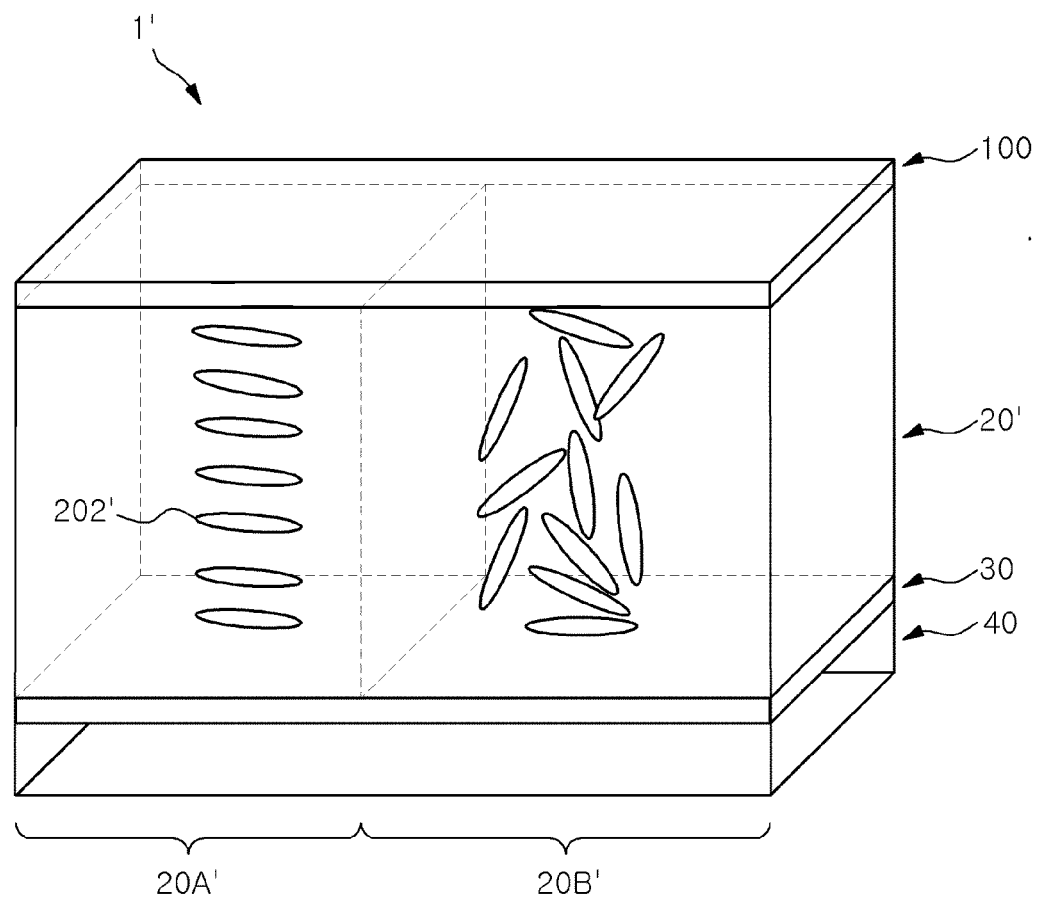

[FIG. 12]
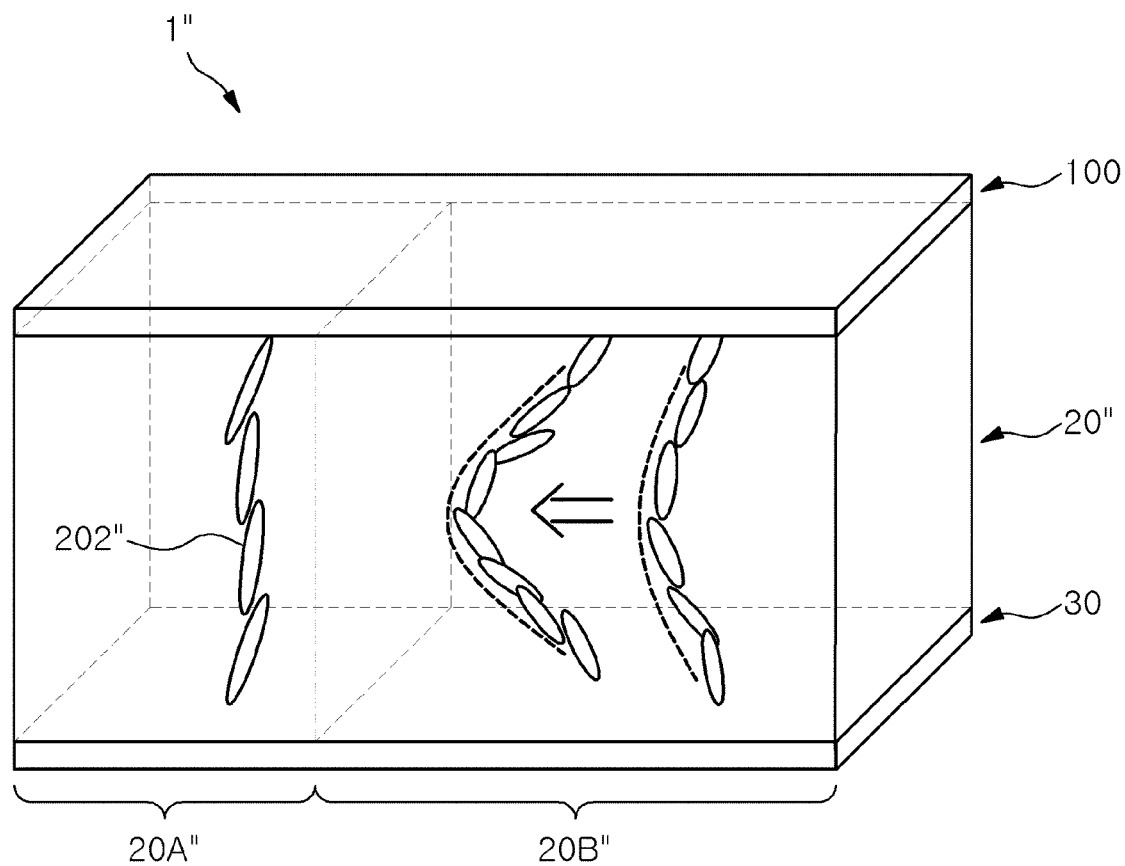

[FIG. 13]
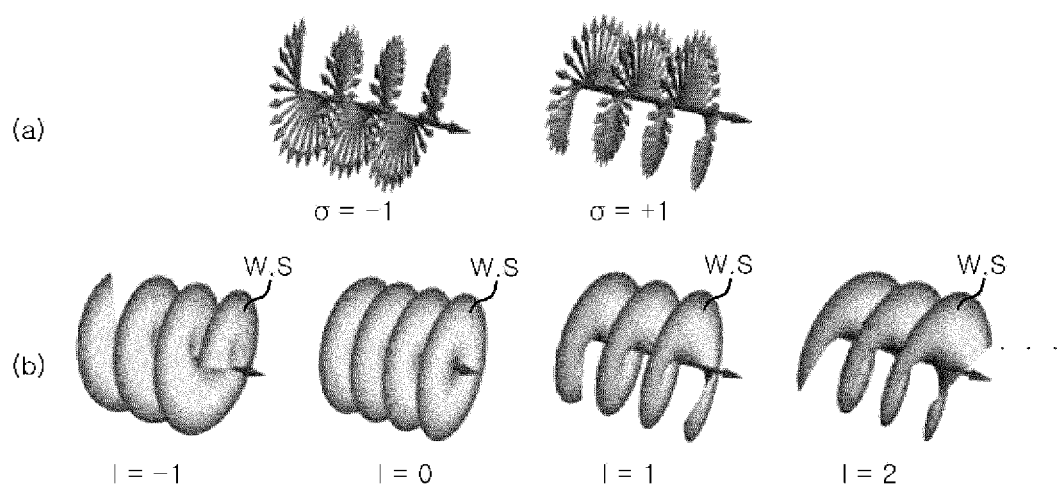

[FIG. 14]
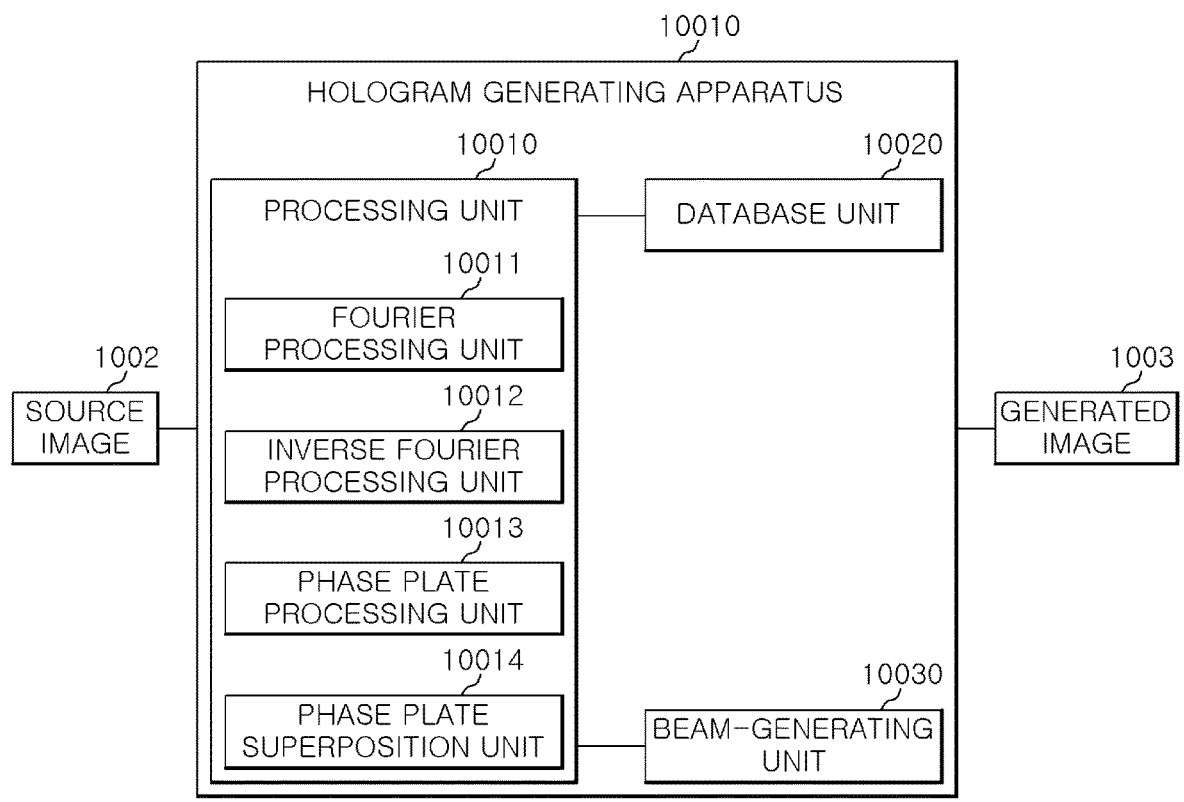

[FIG. 15]
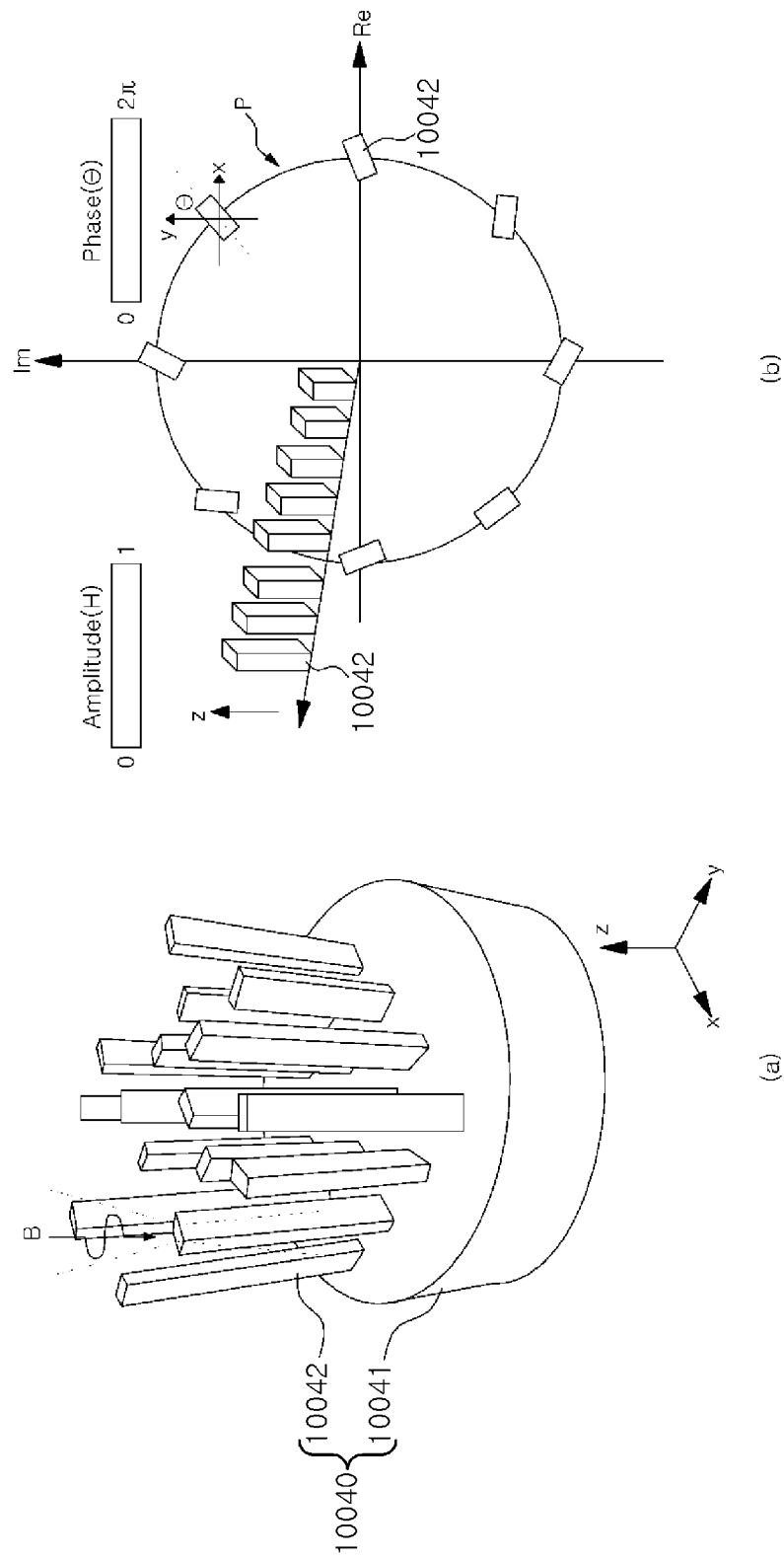

[FIG. 16]
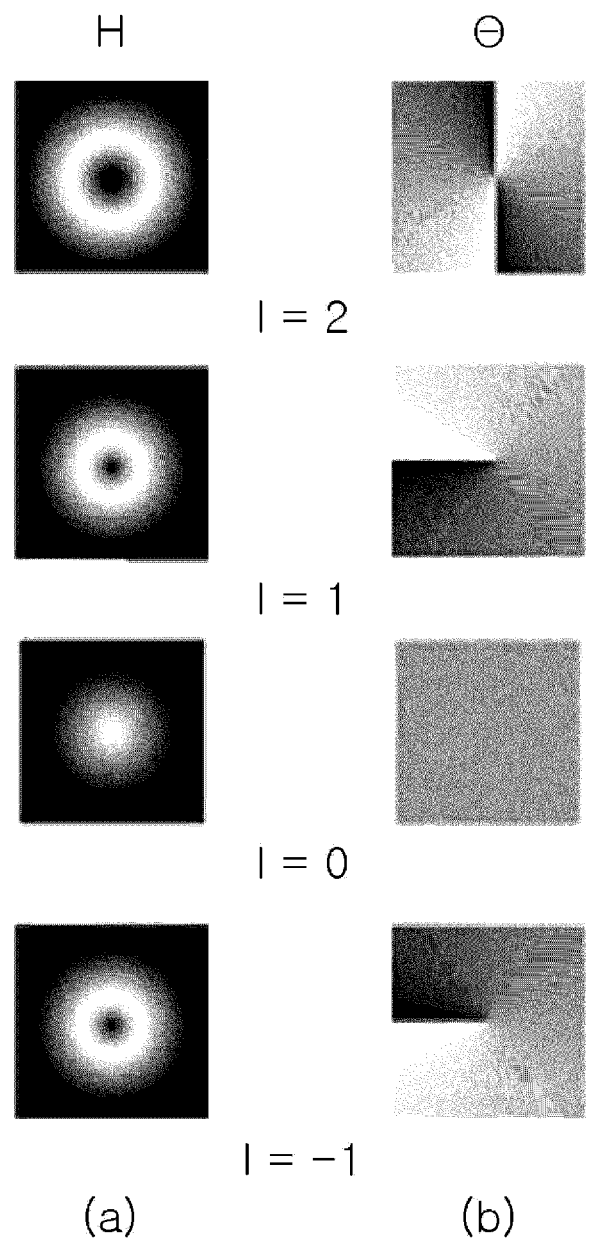

[FIG. 17]
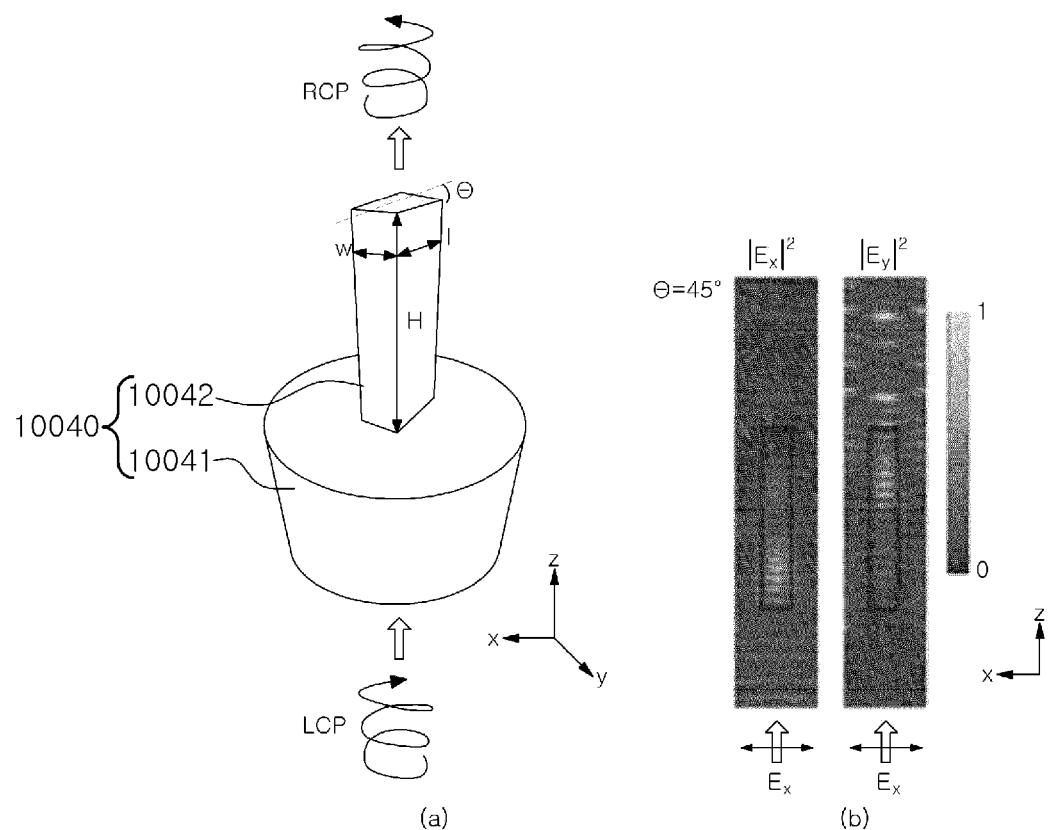

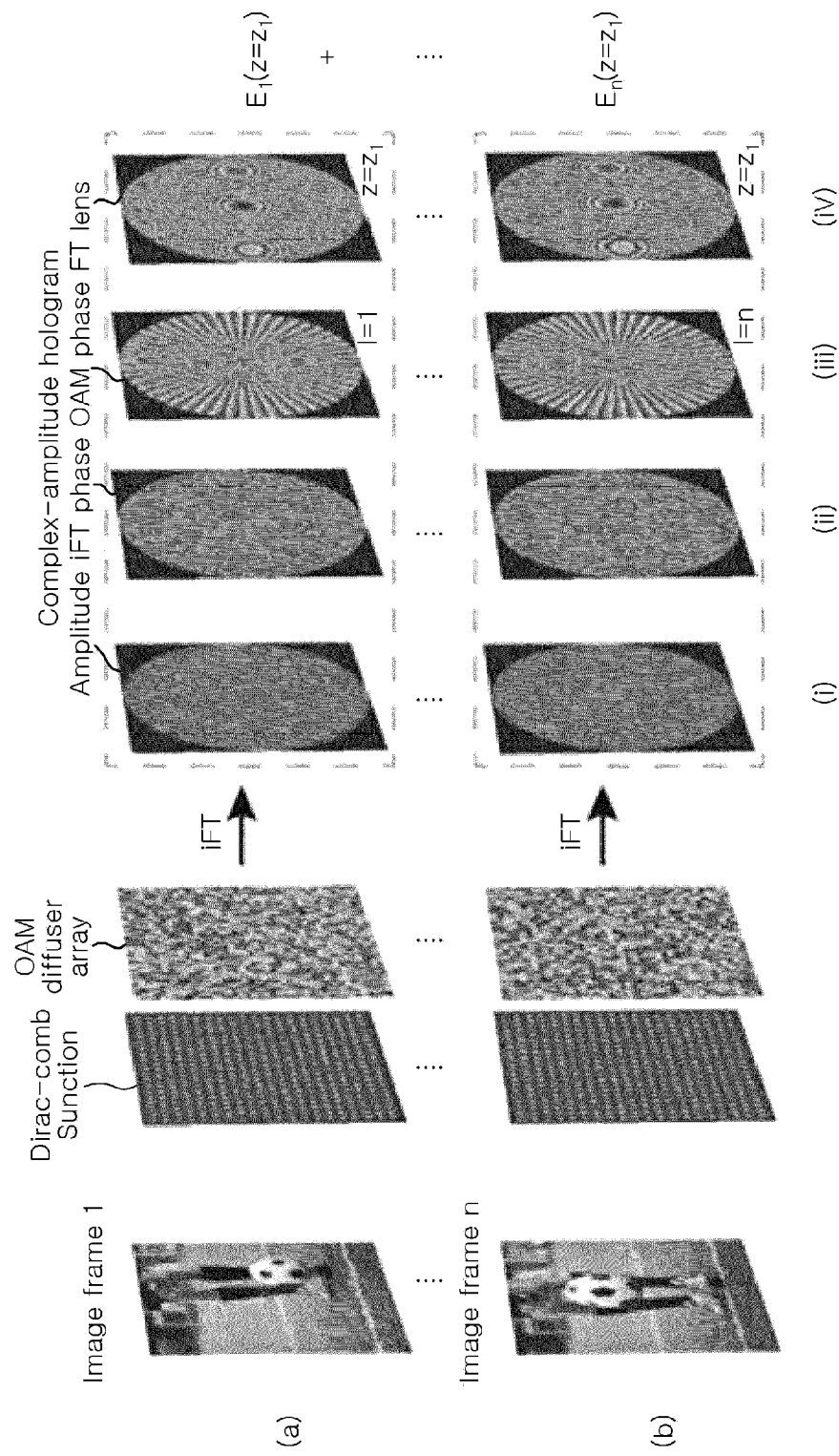
[FIG. 18]

[FIG. 19]
10040
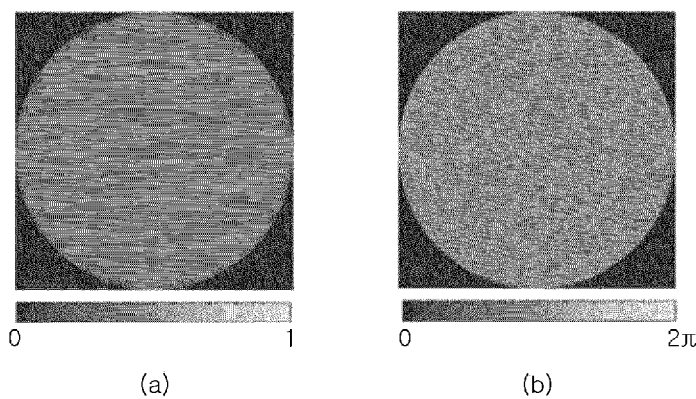
(a)     (b)
[FIG. 20]
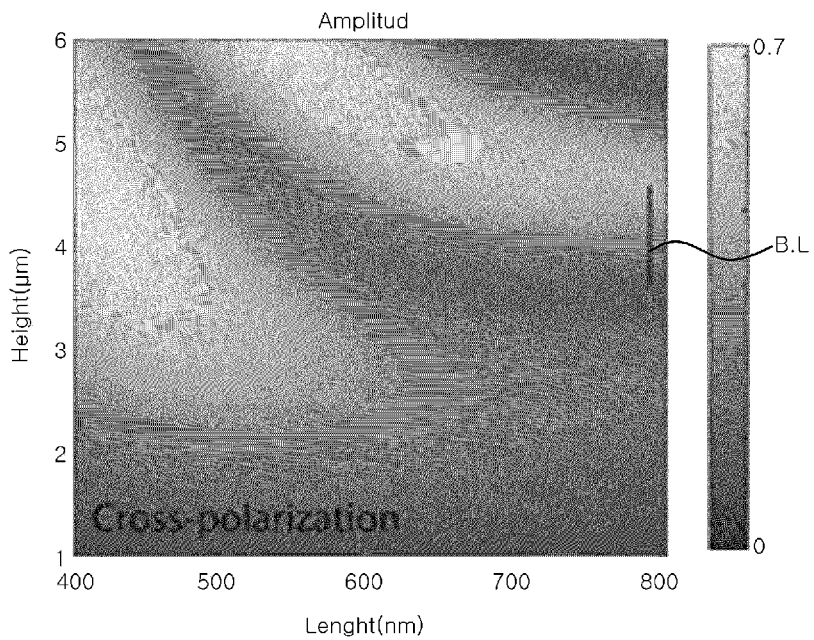

[FIG. 21]
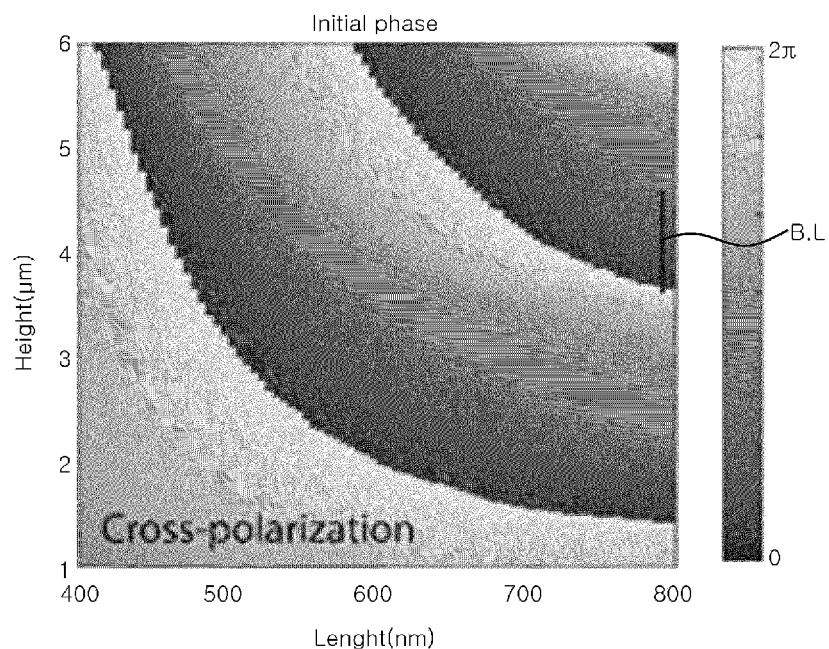
[FIG. 22]
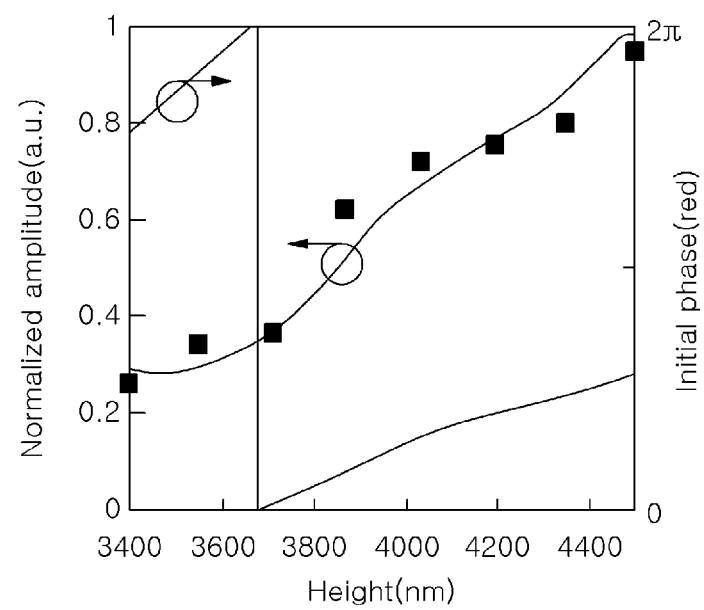

[FIG. 23]
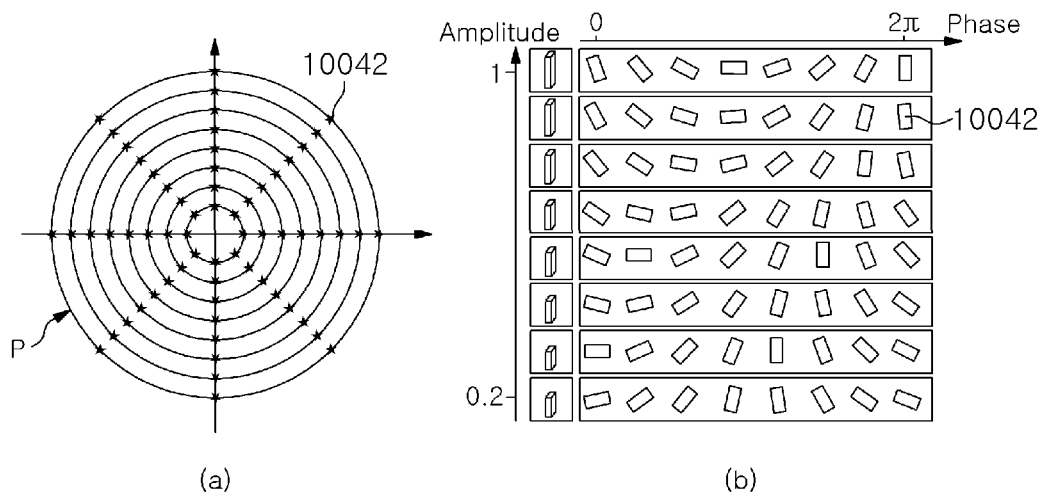
(a)  (b)

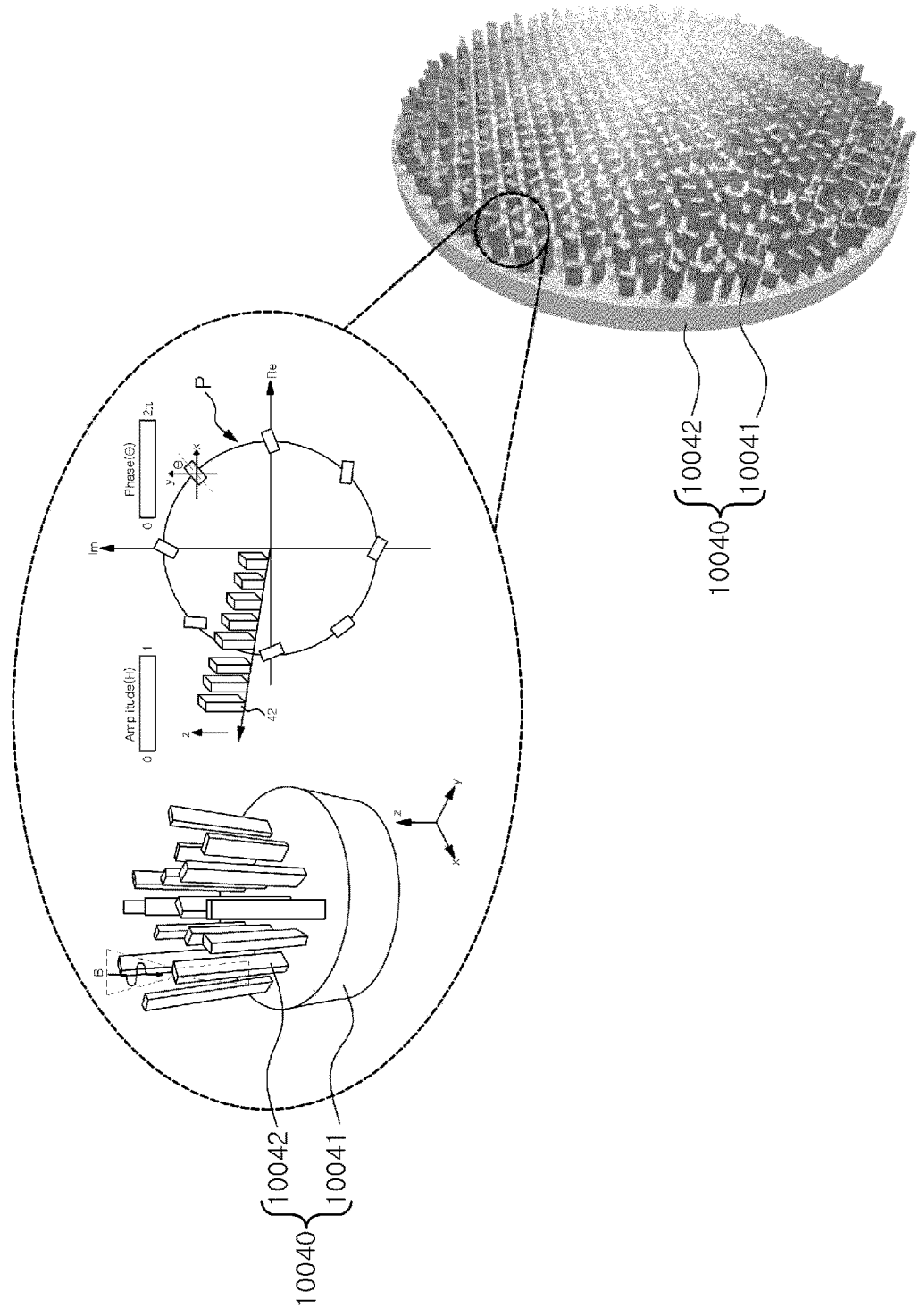
[FIG. 24]

[FIG. 25]
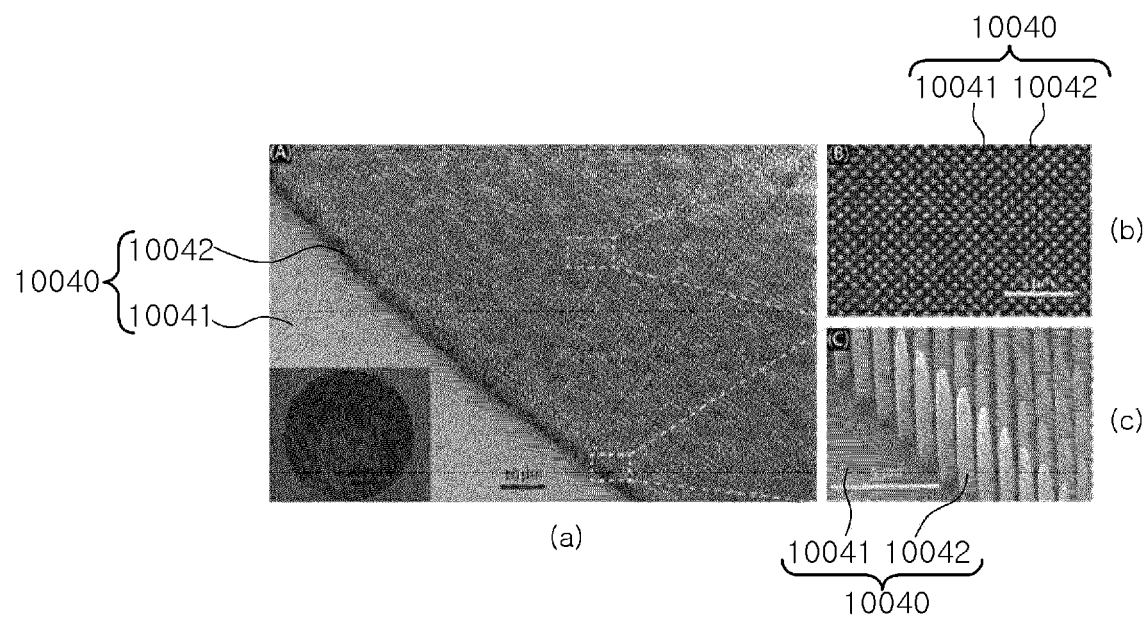

[FIG. 26]
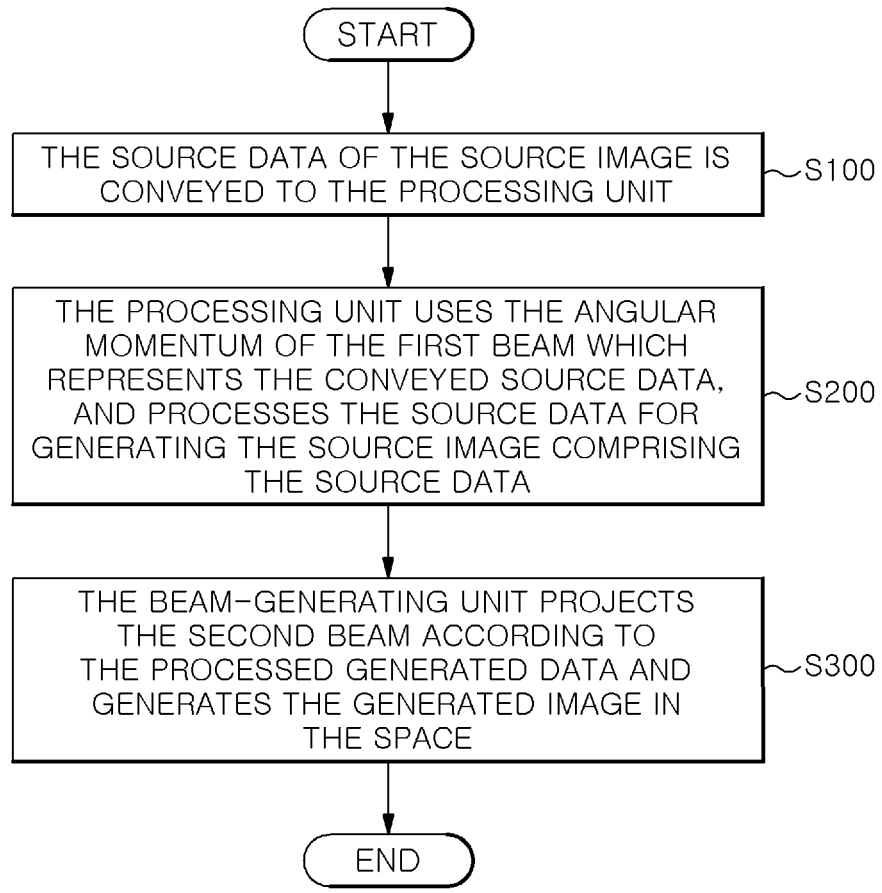
[FIG. 27]
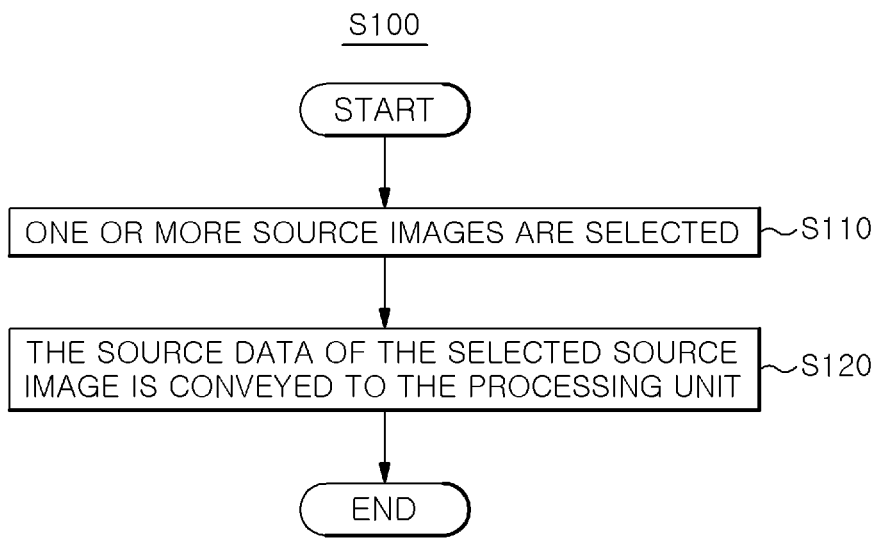

[FIG. 28]
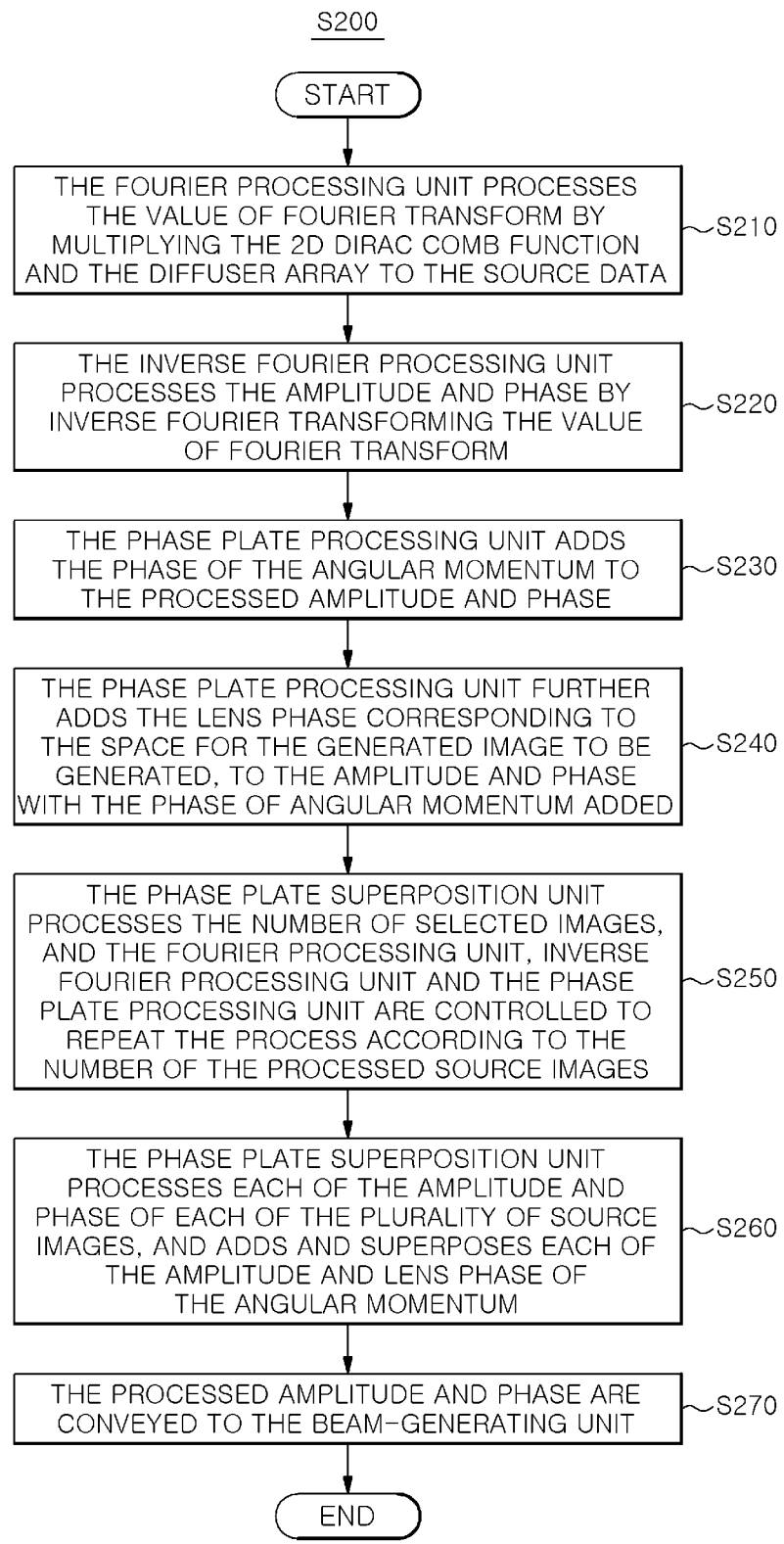

[FIG. 29]
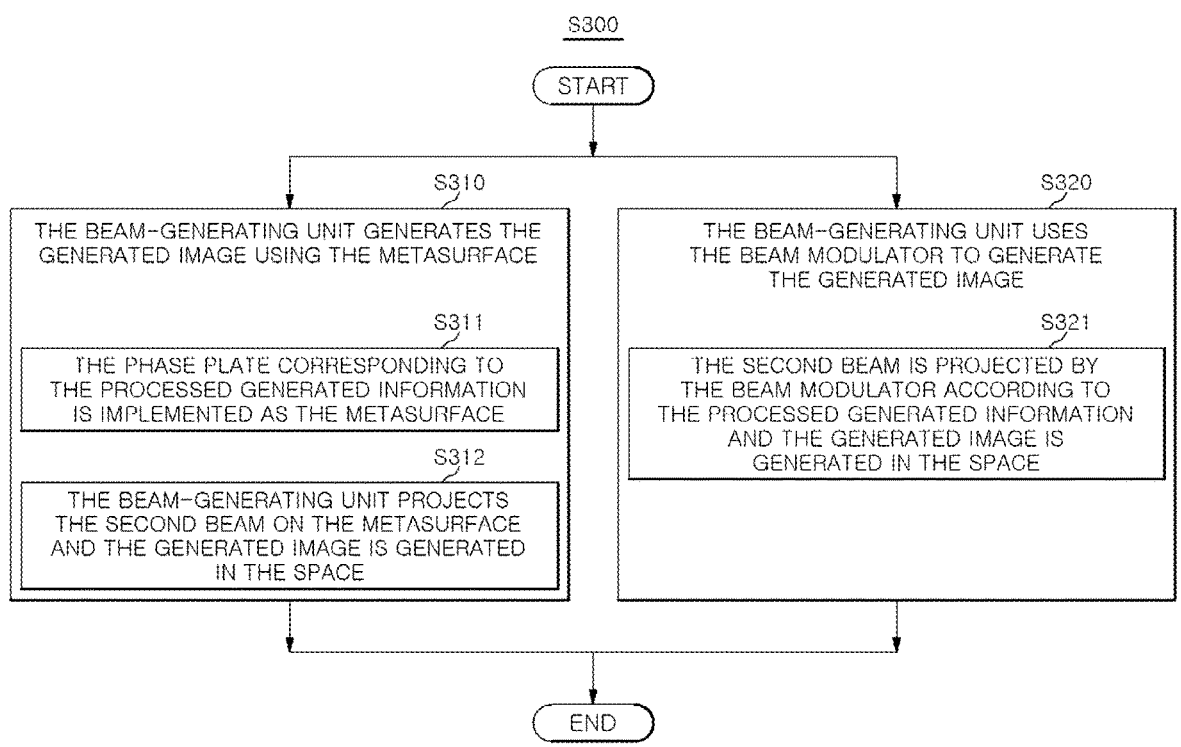

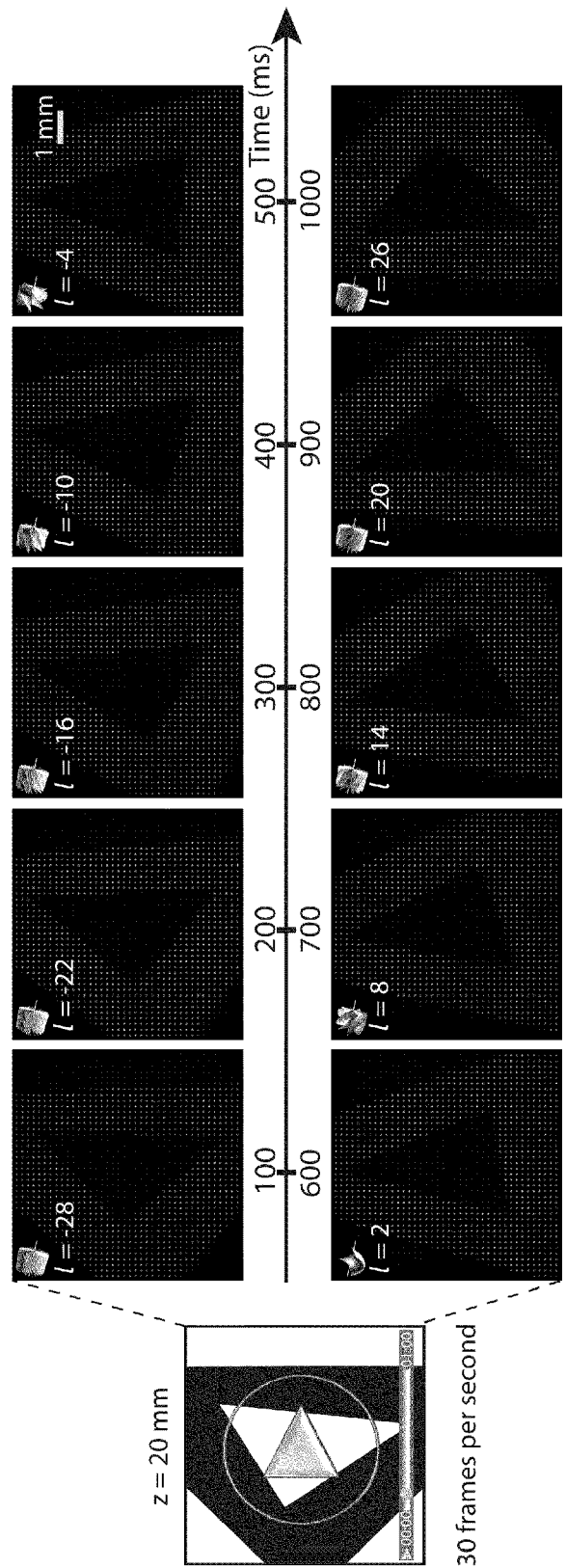
[ FIG. 30 ]

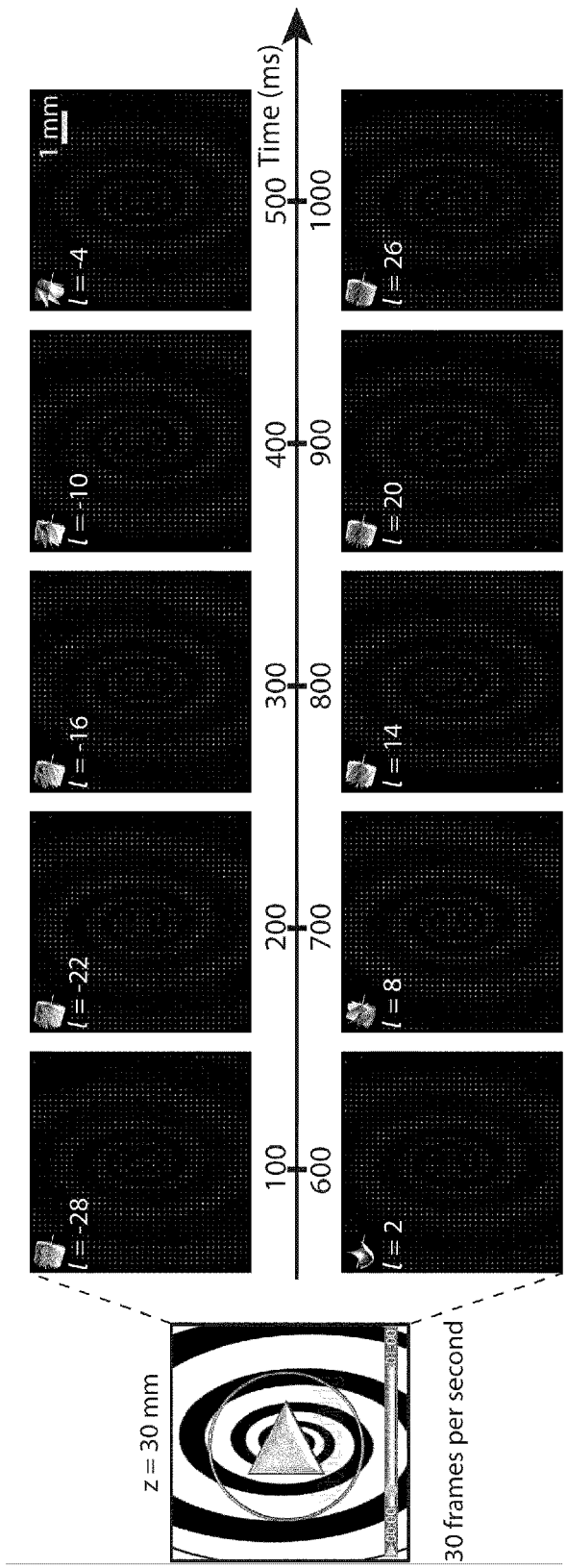
[ FIG. 31 ]

STIMULUS-RESPONSIVE DYNAMIC META-HOLOGRAPHIC DEVICE

TECHNICAL FIELD

This disclosure relates to a stimulus-responsive dynamic meta-holographic device.

BACKGROUND

A hologram is defined as a video produced with interference of light. In specific, a hologram is a technology configured to reproduce a three-dimensional figure, and is configured to reproduce each part of the data of an object into a three-dimensional figure as it is by the interference between an object wave reflected off of an object using characteristics of a laser, and a reference wave projected straight from another angle.

Recently, attempts were made to implement a hologram with flat optics which are materialized through artificially created 2D material platform called optical metasurfaces.

However, despite the previous attempts, a display or an equipment configured to produce a plurality of hologram images real time by activating optical metasurfaces has not been developed.

SUMMARY

The exemplary embodiments of the disclosure, which have been conceived to address above-described problems, are to provide a stimulus-responsive dynamic meta-holographic device configured to produce a plurality of hologram images in real time.

In addition, they are to provide a stimulus-responsive dynamic meta-holographic device configured to produce different hologram images according to outer stimuli (e.g., Electricity, temperature, pressure).

According to an aspect of the present invention, there is provided a stimulus-responsive dynamic meta-holographic device comprising a metasurface where a plurality of nanostructures are provided; and a liquid crystal layer provided on one side of the metasurface, comprising a plurality of cells configured to be altered in arrangement by an outer stimulus; and wherein the liquid crystal layer is configured to change polarization state of a transmitted beam penetrating the liquid crystal layer as the plurality of the cells are altered in arrangement by the outer stimulus.

Further, there is provided a stimulus-responsive dynamic meta-holographic device, wherein a plurality of nanostructures comprising a nanostructure included in a first nanostructure group, and a nanostructure included in a second nanostructure group, and wherein the nanostructure included in the first nanostructure group and the nanostructures included in the second nanostructure group are arranged orthogonally.

Further, there is provided a stimulus-responsive dynamic meta-holographic device, wherein the nanostructures are provided as hydrogenated amorphous silicon.

Further, there is provided a stimulus-responsive dynamic meta-holographic device, wherein the nanostructure is 120 nm to 250 nm in length and 60 nm to 150 nm in width.

Further, there is provided a stimulus-responsive dynamic meta-holographic device, wherein the plurality of the cells are arranged in one direction when no outer stimulus is applied, and wherein the cells arranged in the one direction are rotated as outer stimulus is applied and rearranged into a different direction from the one direction.

Further, there is provided a stimulus-responsive dynamic meta-holographic device, wherein the liquid crystal layer comprising a first area comprising the plurality of cells arranged in one direction, and a second area in which the cells arranged in the one direction are rotated and arranged in a different direction from the one direction.

Further, there is provided a stimulus-responsive dynamic meta-holographic device, wherein a transmitted beam becomes a first polarization state when an incident beam enters the first area, and wherein the transmitted beam becomes a second polarization state when an incident beam enters the second area.

Further, there is provided a stimulus-responsive dynamic meta-holographic device, wherein the cell is provided as 4-Cyano-4'-pentylbiphenyl.

Further, there is provided a stimulus-responsive dynamic meta-holographic device, wherein the one direction indicates a tangential direction of an upper substrate of a metasurface.

Further, there is provided a stimulus-responsive dynamic meta-holographic device, wherein in upper part of the liquid crystal layer is provided an upper substrate, and wherein in lower part of the liquid crystal layer is provided a lower substrate, and wherein on one side of the upper substrate and the lower substrate is provided an electrode configured to apply a preset volts alternating current on the liquid crystal layer.

Further, there is provided a stimulus-responsive dynamic meta-holographic device, wherein in the liquid crystal layer, when an electric field is formed, the cells are rotated in a parallel direction to the electric field.

Further, there is provided a stimulus-responsive dynamic meta-holographic device, wherein the liquid crystal layer is provided from 5 μm to 15 μm in thickness.

Further, there is provided a stimulus-responsive dynamic meta-holographic device, wherein in the liquid crystal layer, when volts alternating current is applied, the cells are rotated in a vertical direction to an upper substrate.

Further, there is provided a stimulus-responsive dynamic meta-holographic device, wherein an incident beam entering the liquid crystal layer is provided as a linearly polarized beam at 45° to one direction in which the cells are arranged in.

Further, there is provided a stimulus-responsive dynamic meta-holographic device, wherein the outer stimulus is provided as temperature change, and when temperature change occurs in the liquid crystal layer, the cells arranged in one direction are rearranged in a different direction.

Further, there is provided a stimulus-responsive dynamic meta-holographic device, wherein in the liquid crystal layer is provided a cyanobiphenyl liquid crystal E7.

Further, there is provided a stimulus-responsive dynamic meta-holographic device, wherein in the liquid crystal layer with a first temperature range enters an incident beam, the transmitted beam represents a first polarization state, and wherein in the liquid crystal layer with a second temperature range enters an incident beam, the transmitted beam represents a second polarization state.

Further, there is provided a stimulus-responsive dynamic meta-holographic device, wherein the stimulus-responsive dynamic meta-holographic device is comprising a heating layer configured to cause temperature change on at least a part of the liquid crystal layer.

Further, there is provided a stimulus-responsive dynamic meta-holographic device, in the case of an incident beam penetrating the liquid crystal layer without applied pressure, the transmitted beam represents a second polarization state, and in the case of an incident beam penetrating the liquid crystal layer with a first pressure, the transmitted beam represents a second polarization state.

The stimulus-responsive dynamic meta-holographic device 19, wherein the first pressure is 5 kpa to 20 kpa.

BRIEF DESCRIPTION OF DRAWINGS

The stimulus-responsive dynamic meta-holographic device according to an embodiment of the present disclosure can generate a plurality of hologram images real time.

Additionally, it advantageously generates different hologram images according to outer stimuli (e.g., electricity, temperature, pressure).

FIG. 1 shows a schematic view of a stimulus-responsive dynamic meta-holographic device 1 according to an embodiment of the present disclosure;

FIG. 2 shows a schematic view of a partial surface of metasurfaces 10 of stimulus-responsive dynamic meta-holographic device 1;

FIG. 3 shows a view of the phase and transmission rate of the transmitted beam (L2) according to the angle of the nanostructure 102 constructing the upper part of the metasurfaces 10 of FIG. 1;

FIG. 4 shows a view of a contour map with statistically calculated cross-polarized transmission efficiency according to the length(L) and width(W) function of a nanostructure 102 when the incident beam (L1) with a visible light wavelength (e.g., λ=633 nm) is projected in the nanostructure of stimulus-responsive dynamic meta-holographic device 1 of FIG. 1;

FIG. 5 shows a conceptual view of a liquid crystal layer 20 which is a part of the stimulus-responsive dynamic meta-holographic device 1 of FIG. 1;

FIG. 6 shows a Poincaré sphere that may portray the polarized state of a beam penetrating the liquid crystal layer 20 when volts alternating current is applied to the liquid crystal layer of FIG. 6;

FIG. 7 shows schematic view of the formation of the plurality of hologram images (I1, I2) according to the changes in the outer-stimuli when the incident beam (L1) is observed in the stimulus-responsive dynamic meta-holographic device 1 of FIG. 1;

FIG. 8 shows a view of a pencil for size comparison with the stimulus-responsive dynamic meta-holographic device 1 of FIG. 1;

FIG. 9 shows an optical microscope view of metasurface 10 of the stimulus-responsive dynamic meta-holographic device 1, and the magnified nanostructure of the same;

FIG. 10 shows schematic view of a stimuli-responsive dynamic meta-holographic implementation system 2 including the stimulus-responsive dynamic meta-holographic device 1 of FIG. 1;

FIG. 11 shows a schematic view of stimuli-responsive dynamic meta-hologram displays 1' according to another embodiment of the present disclosure;

FIG. 12 shows a schematic view of stimuli-responsive dynamic meta-hologram displays 1" according to another embodiment of the present disclosure;

FIG. 13 shows conceptual view of a spin angular momentum (a) used in earlier technologies and the angular momentum ($\ell$) utilized in the embodiment of the present invention;

FIG. 14 is a view showing a block diagram of the composition of a hologram generating apparatus according to another embodiment of the present disclosure;

FIG. 15 shows conceptual view of the phase plate (a) where the light enters, and the complex plane (b) showing the amplitude and phase decided by the height and the rotation angle of the column of the phase plate;

FIG. 16 shows conceptual view of the example of the amplitude (a) and phase (b) of the light with a particular angular momentum;

FIG. 17 shows conceptual view of the procedure a in which the light incident to the phase is polarized by the column, and the intensity of the polarized light;

FIG. 18 shows conceptual view of the procedure in which each of the first image (a) and the image n (b) is Inverse Fourier Transformed and superposed;

FIG. 19 shows conceptual view of a phase plate created by superposition of the plurality of phase plates in the above procedure, indicated separately into the real part (a) and the imaginary part (b);

FIG. 20 shows a graph illustrating a wavelength of an incident light, and a change in the amplitude of cross-polarization according to the height of the column formed on a phase plate;

FIG. 21 shows a graph illustrating a wavelength of an incident light, and a change in the early phase retardation of cross-polarization according to the height of the column formed on the phase plate;

FIG. 22 shows a graph illustrating a result of an amplitude and phase normalized to optimize the result derived by the above procedure;

FIG. 23 shows conceptual view of data stored in a database unit utilized in the hologram generating apparatus and method of generating the same according to the present disclosure;

FIG. 24 shows conceptual view of the phase plate created by the above procedure;

FIG. 25 shows a view of the phase plate (a) created by the above procedure (a), a magnified perspective view of the part of the phase plate (b), and a magnified view of the column of the phase plate (c);

FIG. 26 shows a sequential view of a flow of the hologram generating method according to the embodiment of the present disclosure;

FIG. 27 shows a sequential view of a flow of a step S100 of the hologram generating method of FIG. 26;

FIG. 28 shows a sequential view of the flow of a step S200 of the hologram generating method of FIG. 26;

FIG. 29 shows a sequential view of the flow of a step S300 of the hologram generating method of FIG. 26;

FIGS. 30 and 31 show conceptual views of a generated image formed by the hologram generating apparatus and method of generating the same according to the embodiment of the present disclosure.

DETAILED DESCRIPTION OF EXEMPLARY EMBODIMENTS

Hereinafter, the specific embodiments of the present disclosure will be described in detail with reference to the figures.

Additionally, it is noted that in the description of the disclosure, the detailed description for known related configurations or functions may be omitted when it is deemed that such description may obscure essential points of the disclosure.

FIG. 1 shows a schematic view of a stimulus-responsive dynamic meta-holographic device 1 according to an embodiment of the present disclosure, FIG. 2 shows a schematic view of a partial surface of metasurfaces 10 of stimulus-responsive dynamic meta-holographic device 1, FIG. 3 shows a view of the phase and transmission rate of the transmitted beam L2 according to the angle of the nanostructure 102 constructing the upper part of the metasurfaces 10 of FIG. 1, FIG. 4 shows a view of a contour map with statistically calculated cross-polarized transmission efficiency according to the length (L) and width (W) function of a nanostructure 102 when the incident beam (L1) with a visible light wavelength (e.g., λ=633 nm) is projected in the nanostructure of stimulus-responsive dynamic meta-holographic device 1 of FIG. 1, FIG. 5 shows a conceptual view of a liquid crystal layer 20 which is a part of the stimulus-responsive dynamic meta-holographic device 1 of FIG. 1, FIG. 6 shows a Poincaré sphere that may portray the polarized state of a beam penetrating the liquid crystal layer 20 when volts alternating current is applied to the liquid crystal layer of FIG. 6, FIG. 7 shows schematic view of the formation of a plurality of hologram images (I1, I2) according to the changes in the outer-stimuli when the incident beam (L1) is observed in the stimulus-responsive dynamic meta-holographic device 1 of FIG. 1, FIG. 8 shows a view of a pencil for size comparison with the stimulus-responsive dynamic meta-holographic device 1 of FIG. 1, FIG. 9 shows an optical microscope view of metasurface 10 of the stimulus-responsive dynamic meta-holographic device 1, and the magnified nanostructure of the same.

The components of metasurface 10 and the liquid crystal layer 20 illustrated in FIGS. 1 to 7 (e.g., the sizes of nanostructure 102 and cell 202) are exaggerated for better understanding.

Referring to FIGS. 1 to 9, there is included in the stimulus-responsive dynamic meta-holographic device 1, the metasurface 10 where the plurality of the nanostructures 102 are provided, and the liquid crystal layer 20 including the plurality of the cells 202 that may be altered in arrangement by outer stimulus.

Different images depending on the outer stimulus may be projected when an incident beam (L1) is penetrated through the stimulus-responsive dynamic meta-holographic device 1. In the present embodiment, the outer stimuli are assumed as one of electricity change, temperature change, and pressure change.

For example, when no outer stimulus is applied to the stimulus-responsive dynamic meta-holographic device 1, first image may be projected when the incident beam (L1) is introduced to the stimulus-responsive dynamic meta-holographic device 1, and when the incident beam (L1) is introduced to the stimulus-responsive dynamic meta-holographic device 1 while outer stimulus is being applied, second image may be projected.

In the present embodiment, the first image and second image are two different images each indicating a helicopter and an airplane (refer to FIG. 7), but the technical idea of the present disclosure is not limited to them, and there is included a generation of other images depending on the structure and the arrangement of the nanostructure 102 of the metasurface 10.

In the present embodiment, the incident beam (L1) may be understood as a light directed towards the stimulus-responsive dynamic meta-holographic device 1 from outside, and the transmitted beam (L2) may be understood as the light penetrating the stimulus-responsive dynamic meta-holographic device 1 and directed away from the stimulus-responsive dynamic meta-holographic device 1.

As the incident beam (L1) enters the stimulus-responsive dynamic meta-holographic device, the transmitted beam (L2) with altered polarization state penetrates the liquid crystal layer 20 and is introduced to the metasurface 10, and the transmitted beam (L2) with altered polarization state penetrates the metasurface 10 to project different hologram images depending on the polarization state.

Further, the polarization state when the incident beam (L1) penetrates the liquid crystal layer 20 may either be left circular polarized beam (L21) or right circular polarized beam (L22) depending on the outer stimulus applied to the liquid crystal layer 20 which penetrates the metasurface 10 and different hologram images may be projected. The liquid crystal layer 20 configured to alter the polarization state of an incident light (L1) will be described further below in detail.

There is included in the metasurface 10 an upper substrate 100 located on the upper part of the liquid crystal layer 20, and the plurality of the nanostructures 102 located on the upper part of upper substrate 100.

The upper substrate 100 may be in a flat plate shape, and a plurality of unit cells 111 may be continuously arranged and formed. Here, the plane is a plane extended towards the x-axis and the y-axis, and the z-axis may be understood as the direction of the incident beam (L1) vertical to the plane.

A singular unit cell 111 may be in a square shape with a side that has the length of P when the xy plane is viewed from the front.

The upper substrate 100 may be provided as silicon dioxide($SiO_2$), and the thickness of the upper substrate 100 may be from 10 nm to 300 nm.

There is provided the plurality of the nanostructures 102 in the upper part of the upper substrate 100. Here, the nanostructures 102 may be provided as hydrogenated amorphous silicon, a-Si; H.

A singular nanostructure 102 may be positioned on the singular unit cell 111, and the nanostructures 102 positioned on the continuously positioned unit cells 111 are arranged to form the metasurface 10.

The nanostructure 102 of the present embodiment may be in a cuboid shape with length, width, and height.

The plurality of the nanostructures 102 may be provided in the size and the arrangement of different hologram images according to the polarization state of the transmitted beam L2 penetrating the metasurface 10.

For example, a first image (I1) may be generated when a left circular polarized beam (L21) penetrates the metasurface 10, and a second image (I2) may be generated when a right circular polarized beam (L22) penetrates the metasurface 10.

The plurality of nanostructures 102 may be formed to prevent the inversion of symmetric phase shift of the transmitted beam (L2) in order to generate a preset plurality of hologram images according to the polarization state of the transmitted beam (L2).

This plurality of the nanostructures 102 may be understood as arranged to use the helicity of asymmetric spin orbit interaction, A-SOI.

Specifically, the plurality of the nanostructures 102 may include the plurality of the nanostructures arranged vertically with each other.

For example, there is included in the plurality of the nanostructures 102, a first nanostructure 1021, a second nanostructure 1022, a third nanostructure 1023, a fourth nanostructure 1024 provided as a first nanostructure group 102A and a fifth nanostructure 1025, a sixth nanostructure 1026, a seventh nanostructure 1027, an eighth nanostructure 1028 provided as a second nanostructure group 102, and the nanostructures 1021, 1022, 1023, 1024 of the first nanostructure group 102A and the nanostructures 1025, 1026, 1027, 1028 of the second nanostructure group 102B may be orthogonally arranged.

Further, the nanostructures 1021, 1022, 1023, 1024 included in the first nanostructure group 102A may be arranged in an identical angle, but have different sizes. Further, the nanostructures 1025, 1026, 1027, 1028 included in the second nanostructure group 102B may be also be arranged in an identical angle, but have different sizes (refer to FIG. 3, the nanostructure illustrated in FIG. 3 is a view of a nanostructure from the top (xy plane)).

As such, the two groups including the nanostructures orthogonal to each other may cover 180 degrees of phase range with the eight steps.

By vertically arranging the nanostructures of the first nanostructure group 102A and the second nanostructure group 102B to each other and optimizing the size of the nanostructures, additional phase shift irrelevant to the directions of the nanostructures, may be achieved. By this, different hologram images may be generated according to the polarization state.

FIG. 4 show the simulation for designing the optimal size of the nanostructure 102. The white line in FIG. 4 may be understood as the optimal length and width of the nanostructure 102. In specific, the nanostructure 102 may be 120 mn to 250 nm in length, and 60 nm to 150 nm in width.

More specifically, when the length of the nanostructure 102 is 120 nm to 160 nm, the nanostructure 102 may be provided with the width of 60 nm to 120 nm, and when the length of the nanostructure 102 is 160 nm to 250 nm, the nanostructure 102 may be provided with the width of 120 nm to 150 nm.

At this time, the height of the nanostructure 102 may be from 300 nm to 500 nm, desirably 350 nm to 400 nm, and 380 nm more desirably.

Further, below is the detailed description of the generation procedure of the plurality of hologram images according to the polarization state of the transmitted beam (L2) entering the metasurface 10.

The phase shift of the transmitted beam (L2) penetrating the metasurface 10 may be expressed as in the equation below.

$$\alpha(x,y)+2\sigma\beta(x,y)$$

Here, $\alpha(x,y)$ represents phase retardation, $\beta(x,y)$ represents the rotation angle of the nanostructure 102, $\sigma=+1$ represents the right circular polarized beam (L22), and $-1$ represents the left circular polarized beam (L21).

Here, the rotation angle of the nanostructure 102 may be a rotation angle based on an arbitrary x-axis or y-axis.

Further, $\alpha(x,y)$ may be spin-independent, and $2\sigma\beta(x,y)$ may be spin-dependent.

The accumulated phase shift through such optimization guarantees the general phase shift, and guarantees generation of wave surface using asymmetric-spin orbit interaction, A-SOI.

Further, the stimulus-responsive dynamic meta-holographic device 1 may be produced in a small size. For example, the plane size (xy plane) of the stimulus-responsive dynamic meta-holographic device 1 may be provided smaller than 2 cm×2 cm, and in 1 cm×1 cm ideally.

As the liquid crystal layer 20 transmits the incident beam (L1), the arrangement of cells 202 is altered by the outer stimulus, and the polarization state of the transmitted beam (L2) entering the liquid crystal layer 20 may be altered. Here, the outer stimulus may include at least one of electricity change, temperature change and pressure change.

For example, the incident beam (L1) is introduced to the liquid crystal layer 20, the transmitted beam(L2) transmitted to the first area 20A of the liquid crystal layer 20 is changed in polarization state to left circular polarized beam (L21), and the transmitted beam (L2) transmitted to the second area 20B of the liquid crystal layer 20 may be changed in polarization state to right circular polarized beam (L22). At this time, the transmitted beam (L2) with changed polarization state transmitting the liquid crystal layer 20 transmits the metasurface 10 located on the upper part of the liquid crystal layer 20 and generates a plurality of images.

There is included a plurality of cells 202 in the liquid crystal layer 20.

For example, the plurality of cells 202 are arranged unidirectionally when no outer stimulus is applied, and when outer stimulus is applied to the above cells 202 arranged in one direction, rotation occurs and may be arranged in different direction from the one direction.

Alternatively, the plurality of the cells 202 is arranged in one direction when the outer stimulus of first size is applied, rotations occur to the cells 202 arranged in one direction when the outer stimulus of second size bigger than first size is applied and may be arranged in different direction from the one direction.

Further, the liquid crystal layer 20 may be provided with the thickness of 5 μm to 15 μm, desirably 12 μm, and 10 μm more desirably.

There is included on the liquid crystal layer 20 the first area 20A which includes the plurality of cells 202 arranged unidirectionally, and the second area 20B in which the cells 202 arranged in one direction rotate due to the outer stimulus and are arranged in different direction from the one direction.

That is, there is included in the liquid crystal layer 20 at least one of the first area 20A or second area 20B as outer stimulus is applied. For example, when the outer stimulus is applied to a part of the liquid crystal layer 20, the liquid crystal layer 20 may include the first area 20A and the second area 20B simultaneously.

When the incident beam (L1) is penetrating the first area 20A of the liquid crystal layer 20, the transmitted beam (L2) may be in the first polarization state, and when the incident beam (L1) is penetrating the second area 20B of the liquid crystal layer 20, the transmitted beam (L2) may be in the second polarization state.

In the present embodiment, description will be made using the transmitted beam (L2) with the first polarization state, which is a left polarized beam (L21), and the transmitted beam (L2) with the second polarization state, which is a right polarized beam (L22), as examples. However, the technical ideas of the present invention is not limited to them, and the transmitted beam (L2) penetrating the liquid crystal layer 20 may be in different polarization states.

Further, the transmitted beam (L2) transmits the metasurface 10 located on the upper part of the liquid crystal layer 20, and the image projected by the metasurface 10 may change according to the polarization state of the transmitted beam (L2).

For example, when the transmitted beam (L2) created by the liquid crystal layer 20 is the left circular polarized beam (L21), the first image may be generated as the left circular polarized beam (L21) transmits the metasurface 10. Further, when the transmitted beam (L2) created by the liquid crystal layer 20 is the right circular polarized beam (L22), the second image may be generated as the right circular polarized beam (L22) transmits the metasurface 10.

Hereinafter, the liquid crystal layer 20 configured to alter the polarization state of the transmitted beam (L2) when the outer stimulus is provided as electricity change, will be described in detail.

In the case of the liquid crystal layer 20 responsive to electricity change, each cell 202 may be provided as a nematic liquid crystal. For example, the nematic liquid crystal may include 4-Cyano-4'-pentylbiphenyl, 5CB.

Further, there is provided the upper substrate 100 of the metasurface 10 on the upper part of the liquid crystal layer 20, and the lower substrate 30 on the lower part of the liquid crystal layer 20.

Further, a preset volts alternating current may be applied on the liquid crystal layer 20 as an electrode (not illustrated in figures) is placed in between the upper substrate 100 and the lower substrate 30, and electric field, E may be formed on the liquid crystal layer 20 when the volts alternating current is applied.

When the volts alternating current is not applied to the liquid crystal layer 20 or the volts alternating current of first size is applied, the plurality of the cells 202 may be arranged unidirectionally. Here, the unidirectional may be made in the direction of tangent of the upper substrate 100 of the metasurface 10.

Further, when the volts alternating current of second size is applied to the liquid crystal layer 20, the cells arranged in one direction 202 may be rotated to be arranged in a different direction from the one direction. Here, it can be understood that the cells 202 arranged in one direction are placed in the first area 20A, and the cells 202 arranged in the different direction are placed in the second area 20B. Further, the plurality of cells 202 arranged in the first area 20A may be arranged in the direction of tangent of the upper substrate 100 of the metasurface 10.

When volts alternating current is applied to the liquid crystal layer 20, electric field, E is created in the liquid crystal layer 20, the unidirectionally arranged cells 202 are rotated in the parallel direction to the to the electric field, and the reordering of the cells 202 may occur. It is understood that the reordering of cells 202 occur in the different direction from the unidirectional.

Further, the response time of the cell 202 rotation may be from 20 ms to 30 ms when the electric field is applied in the liquid crystal layer 20.

The reordering of the cells 202 may change the effective refractive index of the cells 202, and the effective refractive index may be expressed in an equation.

$$\Delta n_{\mathit{eff}} = (n_e n_o) / \sqrt{(n_o^2 \cos\theta^2 + n_e^2 \sin\theta^2)} - n_o$$

Here, $n_e$ indicates an extraordinary reflective index, $n_o$ may indicate an ordinary reflective index, and $\theta=0$ may indicate a tangential orientation.

Therefore, the phase retardation of the cell 202 is implemented and the polarization state of the transmitted beam (L2) transmitting the liquid crystal layer 20 may be controlled accordingly.

Here, the phase retardation of the cell 202 may be expressed as the following equation.

$$\tau = \int_0^d 2\pi \Delta n_{\mathit{eff}}(z) / \lambda \, dz$$

Here, d indicated the thickness of the liquid crystal layer 20, λ may be understood as the wavelength of the incident beam (L1) incident to the liquid crystal layer 20, and the wavelengths of the incident beam (L1) and the transmitted beam (L2) may be identical.

Further, changes in the phase retardation may be controlled by other factors affecting $\Delta n_{\mathit{eff}}(z)$. For example, the phase retardation and the sensitivity of the cell 202 may adjust the thickness of the liquid crystal layer 20, or the arrangement and the anisotropic characteristics of the cell 202 may be implemented by using other materials.

Further, in the case of the liquid crystal layer 20 responsive to electricity change, the polarization state of the transmitted beam (L2) may be changed by the phase retardation of the cell 202 dependent on the electric field occurring on the liquid crystal layer 20.

For example, as the incident beam (L1) penetrates the liquid crystal layer 20 according to the electric field occurring in the liquid crystal layer 20, the transmitted beam (L2) may be output as either the left circular polarized beam (L21) or the right circular polarized beam (L22). Here, it is understood that the electric field is in proportion to the volts alternating current applied to the liquid crystal layer 20.

Further, when a particular volts alternating current is applied to the liquid crystal layer 20, the cells 202 are rearranged and the transmitted beam (L2) may be controlled to be in a particular polarization state.

In specific, when the volts alternating current is applied on the liquid crystal layer 20, the phase retardation of cells 202 occur in which the cells 202 rotate in the vertical direction to the upper substrate 100 and the lower substrate 30, and the transmitted light (L2) transforming from the incident light (L1) may be altered in the polarization state.

For example, when the volts alternating current alternation current of 0.8V is applied to the liquid crystal layer 20, the transmitted beam (L2) may be output as the left circular polarized beam (L21), and when the volts alternating current of 1V is applied, the transmitted beam (L2) may be output as the right circular polarized beam (L22).

Further, the incident beam (L1) may be provided under a particular condition allowing the output transmitted beam (L2) from the liquid crystal layer 20 to be either the left circular polarized beam (L21) or the right circular polarized beam (L22).

In specific, the incident beam (L1) may be provided as a linearly polarized beam at 45° to the one direction (e.g., rubbing direction) in which the cells 202 are arranged. Here, the wavelength of the incident beam (L1) may be provided from 600 nm to 650 nm (ideally 650 nm).

FIG. 6 shows a view of the Poincaré sphere configured to represent the polarization state of the beam penetrating the liquid crystal layer 20 of FIG. 5 when the volts alternating current is applied to the liquid crystal layer 20.

If the cell 202 is provided as 4-Cyano-4'-pentylbiphenyl, 5CB, at 25°, the phase retardation (τ) may be 18.2 rad when the applied volts alternating current (VAC) on the liquid crystal layer 20 is 0 (no outer stimulus). 18.2 rad corresponds to 2.9 turns of the incident beam centered around the axis of rotation (Axis S1) of the Poincaré sphere illustrated in FIG. 6.

Here, the Poincaré sphere may be understood as a spherical surface indicating the polarization state by corresponding to a point on the spherical surface.

In specific, the polarized beam of the beam penetrating the cell 202 when the volts alternating current (VAC) is 0, starts from [S1, S2, S3]=[0,1,0], sequentially passes through [0,0,1], [0,−1,0], [0,0,−1], and may end at the green point rotated 2.9 times centered around the S1 axis. Here, [0,0,1] is the right polarized beam, [0,−1,0] is the linearly polarized beam at 135°, and [0,0,−1] may indicate the left polarized beam.

The polarization state of the transmitted beam (L2) may be controlled as the phase retardation is reduced when the volts alternating current is applied to the cell 202.

For example, when the volts alternating current (VAC) is increased from 0 to 6V, the polarization state of the transmitted beam (L2) rotates in a clockwise direction from the Poincaré sphere and the polarization (green point on FIG. 6) of the transmitted beam may be measured.

FIG. 10 shows schematic view of the stimuli-responsive dynamic meta-holographic implementation system 2 including the stimulus-responsive dynamic meta-holographic device 1 of FIG. 1.

Referring to FIG. 10, there is included in the stimuli-responsive dynamic meta-holographic implementation system 2, a light source 302 configured to project visible light wavelength; a half-wave plate 304 which a beam from the light source 302 penetrates; a first mirror 306 and a second mirror 308 configured to reflect the beam from the half-wave plate 304; a polarizer 310 configured to convert the beam from the second mirror 308 to a linearly polarized beam at 45°; the stimulus-responsive dynamic meta-holographic device 1 according to an embodiment of the present invention; and a lens 312 configured to form a plurality of hologram images.

FIG. 11 shows schematic view of the stimulus-responsive dynamic meta-holographic device 1' according to another embodiment of the present disclosure.

Referring to FIG. 11, the liquid crystal layer 20' configured to alter the polarization state of the transmitted beam (L2) when the outer stimulus is provided as temperature change, will be described in detail. However, the stimulus-responsive dynamic meta-holographic device 1' of the embodiment illustrated in FIG. 11 and the stimulus-responsive dynamic meta-holographic device 1 of the embodiment illustrated in FIG. 11 differ in the crystal layer 20' so descriptions will primarily be made on the differences, and the above mentioned descriptions and reference numbers will be used for the identical parts.

When the incident beam (L1) is penetrated through the stimulus-responsive dynamic meta-holographic device 1' illustrated on FIG. 11, different images may be generated according to temperature change.

In specific, there is included in the liquid crystal layer 20' the first area 20A' comprising a plurality of cells 202' arranged in one direction, and the second area 20B' in which the cells 202' are arranged in the different direction from the one direction when rotated as outer stimulus is applied. Here, the outer stimulus may be understood as temperature change.

In the case of the incident beam (L1) penetrating the first area 20A' of the liquid crystal layer 20', the transmitted beam (L2) may be in the first polarization state, and in the case of the incident beam (L1) penetrating the second area 20B' of the liquid crystal layer 20', the transmitted beam(L2) may be in the second polarization state.

Further, the transmitted beam (L2) penetrates the metasurface 10 positioned in the upper part of the liquid crystal layer 20', the image generated on the metasurface 10 may be altered according to the polarization state of the transmitted beam (L2), and the detailed description of this procedure will be replaced with the above descriptions.

In the case of the liquid crystal layer 20' responsive to temperature change, the liquid crystal layer 20', may be provided as a nematic phase.

In specific, there is included in the cell 202' provided on the liquid crystal layer 20' a cyanobiphenyl type liquid crystal E7 (At 25° $\Delta n$=0.2116, wavelength ($\lambda$)=633 nm) comprising aliphatic tails.

The thickness of the liquid crystal layer 20' may be provided from 5 μm to 15 μm, desirably 8 μm to 12 μm, and 10 μm more desirably.

In the case of the liquid crystal layer 20' responsive to temperature change, there is an advantage of being able to implement the phase retardation of the cell 202' in the general visible spectrum without optical attenuation.

In specific, when the liquid crystal layer 20' is heated and the temperature of the liquid crystal layer 20' rises, the heat energy rearranges the unidirectionally arranged cells 202' (in specific, reduces the sequence of the cells 202' in the direction of reducing $\Delta n_{eff}$), and may reduce the phase retardation of the cells 202'.

Such rearrangement of the cells 202' may be used similarly to the electricity change above, can control the polarization state of the transmitted beam (L2).

For example, the liquid crystal layer 20' may function from −60° C. to 60° C.

Further, there is provided in the stimulus-responsive dynamic meta-holographic device 1' a heating layer 40 which may apply temperature change to the liquid crystal layer 20'. For example, there is provided the heating layer 40 on one side of the lower substrate 30. In the case of temperature change caused by the heating layer 40 in the liquid crystal layer 20', the cells 202' in the liquid crystal layer 20' are rearranged to change the polarization state of the incident beam (L1).

Further, in the case of the liquid crystal layer 20' responsive to temperature change, the polarization state of the transmitted beam (L2) may be changed by the phase retardation of the cells 202' subordinated to the temperature change of the liquid crystal layer 20'.

For example, when the liquid crystal layer 20' is in the first temperature range, the transmitted beam (L2) may be output as the right polarized beam (L22), and when the liquid crystal layer 20' is in the second temperature range, the transmitted beam (L2) may be output as the left polarized beam (L21).

For example, the first temperature range may be from 20° C. to 30° C., and the second temperature range may be from 40° C. to 50° C. More specifically, the transmitted beam (L2) may be output as right polarized beam (L22) when the liquid crystal layer 20' is at 24° C., and the transmitted beam (L2) may be output as left polarized beam (L21) when the liquid crystal layer 20' is at 47° C.

However, such temperature ranges are exemplary, and the idea of the present invention is not limited to such temperature ranges.

Since it is possible to polarize the polarization state according to such temperature change and the plurality of images may be generated accordingly, the stimulus-responsive dynamic meta-holographic device 1' may be implemented as a hologram mark attached to a package including temperature-sensitive food (e.g., seafood, dairy products) or chemical materials (e.g., a photoresist, reactive monomer).

FIG. 12 shows schematic view of stimulus-responsive dynamic meta-holographic device 1" according to another embodiment of the current disclosure.

Referring to FIG. 12, in the case where outer stimulus is provided as pressure change, the liquid crystal layer 20" configured to alter the polarization state of the transmitted beam (L2) will be described in detail. However, the stimulus-responsive dynamic meta-holographic device 1" of the embodiment illustrated in FIG. 12, and the stimulus-responsive dynamic meta-holographic device 1 of the embodiment illustrated in FIG. 1 differs in the liquid crystal layer 20", so descriptions will mainly be made on the differences and the equivalent aspects will be quoted by the above descriptions and reference numbers.

In the case of the incident beam (L1) penetrating the stimulus-responsive dynamic meta-holographic device 1" illustrated in FIG. 12, different images may be generated according to the pressure change.

That is, when touching the stimulus-responsive dynamic meta-holographic device 1", pressure change occurs on the liquid crystal layer 20", the polarization state of the beam penetrating the liquid crystal layer 20" may change, and such beam may produce a plurality of different images by penetrating the metasurface 10.

In specific, there is included in the liquid crystal layer 20" the first area 20A" comprising the plurality of cells 202" arranged in the first direction corresponding to the upper substrate 100 of the metasurface 10; and the second area 20B" in which the pressure is applied to the cells 202" arranged in the first direction corresponding to the upper substrate 100, and the cells 202" are rearranged.

At this time, the direction) may be at 80° to 110° to the upper substrate 100 and desirably at 90° (perpendicular to the upper substrate).

In the case of the incident beam (L1) penetrating the first area 20A" of the liquid crystal layer 20", the transmitted beam (L2) may be in the second polarization state, and in the case of the incident beam (L1) penetrating the second area 20B" of the liquid crystal layer 20', the transmitted beam (L2) may be in the first polarization state.

Here, the second polarization state may be the left polarized beam (L21), and the first polarization state may be the right polarized beam (L22).

The thickness of the liquid crystal layer 20" responsive to pressure change may be provided from 15 μm to 25 μm, desirably from 18 μm to 22 μm, and 20 μm more desirably.

When no pressure is applied to the liquid crystal layer 20", the cells 202" may be arranged in the first direction.

When pressure is applied to the liquid crystal layer 20" (e.g., touch with a finger), the cells 202" are rearranged and phase retardation may increase.

As such, rearrangement of the cells 202" according to the pressure may be used to control the polarization state of the transmitted beam (L2).

Further, in the case of the liquid crystal layer 20" responsive to pressure change, the polarization state of the transmitted beam (L2) may be altered by the phase retardation of the cells 202" dependent on the pressure change of the liquid crystal layer 20".

For example, when no pressure is applied to the liquid crystal layer 20" the transmitted beam (L2) represents the second polarization state, and when the first pressure is applied to the liquid crystal layer 20", the transmitted beam (L2) represents the first polarization state.

Here, the first pressure may be from 5 kpa to 20 kpa, and 10 kpa desirably.

Further, the sensitivity of the pressure applied to the liquid crystal layer 20" may be controlled by the structure of the cells 202" and the elasticity of the upper substrate 100 and the lower substrate 30.

In the case where the liquid crystal layer 20" responsive to pressure change is provided, the stimulus-responsive dynamic meta-holographic device 1" may convert a plurality of hologram images with a simple touch, and the stimulus-responsive dynamic meta-holographic device 1" may be applied to smart safety labels of a product or a work of art.

In particular, when the two way touch-responsive liquid crystal layer 20" is applied, it may be applied as a smart sensor configured to distinguish an outer contact or an impact by scanning the permanently converted hologram mark.

While until now the stimulus-responsive dynamic meta-holographic device and the implementation system for it according to examples of the disclosure have been described as concrete embodiments, these are just exemplary embodiments, and the present disclosure should be construed in the broadest scope consistent with the fundamental technical ideas disclosed herein, rather than as being limited to them. By combining or replacing a part or parts of embodiments disclosed herein, a person having ordinary skill in the art may practice an embodiment which is not explicitly described herein, and however, it should be noted that it shall not depart from the scope of the patent right of this disclosure. Besides, a person having ordinary skill in the art may easily change or modify embodiments disclosed herein based on this disclosure, and however, it is obvious that such changes or modifications also fall within the scope of the patent right of this disclosure.

Hereinafter, a hologram generating apparatus and method of generating the same will be described according to another embodiment of the present disclosure.

The hologram generating apparatus and method of generating the same in this embodiment is intended for the purpose of providing a hologram generating apparatus and method of generating the same configured to convert data included in an image.

Further, the intention of this embodiment is to provide a hologram generating apparatus and method of generating the same configured to readily convert data included in an image.

Further, the intention of this embodiment is to provide a hologram generating apparatus and method of generating the same configured to readily convert data included in a plurality of images.

Further, the intention of this embodiment is to provide a hologram generating apparatus and method of generating the same configured to achieve the intentions mentioned above.

Hereinafter, referring to FIGS. 13 to 31, the hologram generating apparatus 1001 and method of generating the same according to embodiments of the present disclosure will be described in detail. Detailed description for components may be omitted to clarify characteristics of the present disclosure.

1. Definitions

In the description below, the terminology "image" refers to the technical idea of conceiving spatial distribution such as emission, charge and reflectivity into either the identical or into another spatial distribution of different physical characteristics.

In the description below, the terminology "hologram" refers to a video represented in three dimensions. A hologram may be represented in a static image or a video. In an embodiment, a hologram may be generated through the principle of holography.

In the description below, the terminology "meta material" refers to a material composed of a periodic array of meta atoms designed with metals or dielectric substances with similar or smaller wavelength of light in order to embody characteristics non-existent in the natural world. In an embodiment, a meta material may be in interaction with waves such as light, electromagnetic waves and sound waves.

In the description below, the terminology "meta surface" refers to a structure formed of metal materials. In an embodiment, a meta surface itself may be formed of meta materials. In another embodiment, a meta surface may be formed of a material's surface of heterogeneity.

In the description below, the terminology "source image 1002" refers to an image which includes data to be saved. In an embodiment, the source image 1002 may be composed of digitally saved static images or videos.

In the description below, the terminology "source data" refers to the data included in the source image 1002. In an embodiment, a source data may be implemented in a form of light or electrical signal.

In the description below, the terminology "generated image 1003" refers to an image formed separately from the source image 1002 but has the data of the source image 1002. The generated image 1003 may be composed of static images or videos. In an embodiment, a generated image 1003 may be created in the form of a hologram.

In the description below, the terminology "generated data" refers to the data used for creation of a generated image 1003. Therefore, a generated data may be defined as the data included in a generated image 1003.

In the description below, the terminology "reference data" refers to the data used as a basis for the processing unit 10010 to process generated data with the source data. As will be stated below, the reference data may be saved in the database unit 10020.

In the description below, the terminology "beam" refers to an electromagnetic wave configured to generate a visual signal. In an embodiment, the beam may be supplied with a laser. In another embodiment, the beam may be used as a comprehensive terminology including ultraviolet rays and infrared rays.

In the description below, the terminology "first beam" refers to the particular beam among the beams which includes the source image 1002.

In the description below, the terminology "second beam" refers to the particular beam among the beam, which is irradiated to generate the generated image 1003.

In the description below, the terminology "connection" refers to a connection between two or more components in which currents or electric signals can be conveyed through. In an embodiment, a connection may be formed through wired connection such as cable assembly or through wireless connection such as Bluetooth or Wi-Fi.

Detailed description of the hologram generating apparatus 1001 according to the embodiments of the present invention.

Referring to FIG. 13, the hologram generating apparatus 1001 and method of generating the same according to the embodiments of the present invention stated below, presumes utilization of Angular Momentum, OAM among various characteristics of the beam.

Angular Momentum ($\ell$) of beam is one of many components of beam's angular momentum decided by spatial distribution of an electric field. The angular Momentum ($\ell$) of the beam may be decided by a helical wave surface on the axis of the direction in which the beam proceeds.

The angular momentum of beam may be expressed in a whole number. Further, wherein the value corresponds to a helical wave surface, is generated and proceeded.

For example, if that value is 1, the wave surface generated as the beam proceeds, is formed in a shape that has undergone one rotation either clockwise or anti-clockwise at 360°. Further, if the value is −1, the wave surface generated as the beam proceeds, is formed in a shape that has undergone one rotation in just one of clockwise or anti-clockwise at 360°.

At this time, angular momentum ($\ell$) may theoretically be infinitely generated. Therefore, traditional method of conveying data through spin angular momentum, SAM, only two types of data 1 or −1 may be conveyed, whereas unlimited number of data may be conveyed through angular momentum ($\ell$).

The hologram generating apparatus 1001 according to an embodiment of the present disclosure, receives the beam which includes the data of the source image 1002, and may either save the beam or convert it into a generated image 1003 which is interpretable. For this, the hologram generating apparatus 1001 includes the processing unit 10010 and the beam-generating unit 30 for generating images according to the processed results.

In an embodiment, the source image 1002 may be supplied in a digital image file printed out through a computer or electric devices. Further, the generated image 1003 created by the hologram generation apparatus 1001 may be in a two-dimensional or three-dimensional hologram format.

Referring to FIGS. 14 to 25, there is included the processing unit 10010, the database unit 10020 and the beam-generating unit 30 in the hologram generating apparatus 1001 according to an embodiment shown.

At this time, the processing unit 10010 and the database unit 10020 are connected. Either one of the processing unit 10010 or the database unit 10020 may convey current or electric signal to one or more other components.

(1) Description of the Processing Unit 10010

The processing unit 10010 processes the beam containing the data of the source image 1002 with various methods into data required to produce generated image 1003.

At this time, the data of the source image 1002 may be defined as "source data" and the data required to produce the generated image 1003 may be defined as "generated data".

The processing unit 10010 can receive the source data of the source image 1002. In the embodiment where the source image 1002 is supplied in a digital file format, the processing unit 10010 may receive the source image 1002 through electrical communication.

The processing unit 10010 uses the angular momentum ($\ell$) of the first beam which is used for presenting received source data, to form required data for forming generated image 1003 which includes source data.

The processing unit 10010 is connected to the database unit 10020. The processing unit 10010 may receive the supporting data required for carrying out various processes stated below from the database unit 10020.

The processing unit 10010 can be provided in an arbitrary form capable of data input, output, processing and saving. In an embodiment, the processing unit 10010 may be provided including a central processing unit (CPU), a microprocessor, a secure disk (SD), a solid state disk (SSD), a hard disk (HDD), random access memory (RAM) and more.

In the embodiment shown, the processing unit 10010 includes a Fourier processing unit 10011, an Inverse Fourier processing unit 10012, a phase plate processing unit 10013, and a phase plate superposition unit 10014.

Each component of the processing unit 10010 stated below will be interconnected with each other.

Hereinafter, functions of each component of the processing unit 10010 will be first described, and the process will be further described in detail using formulas.

The Fourier processing unit 10011 processes the complex amplitude field value which corresponds to the angular momentum ($\ell$) of the beam forming the source image 1002. The processed complex amplitude field value may be processed in a form of Fourier Transform.

The Fourier processing unit 10011 can process complex amplitude field value with a plurality of angular momentums ($\ell$) of beam that forms the source image 1002.

In specific, the Fourier processing unit 10011 can process Fourier transform of the complex amplitude field value by multiplying 2D Dirac-comb function decided by the above angular momentum ($\ell$) with a random phase.

The Inverse Fourier processing unit 10012 is the processing unit 10010 transforming the Fourier transform carried out by the Fourier processing unit 10011. The Inverse Fourier processing unit 10012 is connected to the Fourier processing unit 10011.

In specific, the Inverse Fourier processing unit 10012 Inverse Fourier transforms the value of Fourier Transform processed by the Fourier processing unit 10011 and processes the amplitude and the Inverse Fourier Transform phase, iFT phase of the source image 1002

In this case, the Inverse Fourier Transformed amplitude and phase processed by the Inverse Fourier processing unit 10012 may be expressed in complex amplitude field value.

In this case, the value inverse Fourier Transformed by the Inverse Fourier processing unit 10012, may be understood as separate items to each of the multiple beams emitted by the source image 1002.

The output of the Inverse Fourier processing unit 10012 is conveyed to the phase plate processing unit 10013 and is utilized to carry out the process of transforming a singular image. The Inverse Fourier processing unit 10012 and the phase plate processing unit 10013 are connected.

The phase plate processing unit 10013 uses the output of the Fourier processing unit 10011 and the Inverse Fourier processing unit 10012 to carry the process of producing particular images when a light with a particular angular momentum number (l) is incident.

In other words, the phase plate processing unit 10013 processes the structural value of the phase plate of the beam-generating unit 30 which produces a generated image 1003 corresponding to a singular source image 1002

The phase plate processing unit 10013 adds the first beam, which is the angular momentum ($\ell$) of the beam that includes the data of the source image 1002, to the Inverse Fourier Transform amplitude and phase processed by the Inverse Fourier processing unit 10012.

Additionally, the phase plate processing unit 10013 adds the lens phase corresponding to the focal length of the space for the generated image 1003, to the amplitude and phase with the angular momentum ($\ell$) of the first beam added.

In the description below is explained under the premise that the phase plate processing unit 10013 processes the phase plate 10040 and the structure of the column 10042 in the phase plate 10040. Alternatively, the phase plate processing unit 10013 and the phase plate superposition unit 10014 are configured to process the reference data for generating generated images 1003 in the beam modulator.

In all cases, since the process of converting the beam of the source image 1002 into the beam of the generated image 1003 is identical, hereinafter the descriptions will be made under the premise that the phase plate processing unit 10013 and the phase plate superposition unit 10014 process the structure to construct the phase plate 10040.

As illustrated on FIG. 15, phase plate 10040 may be provided with a plural number of columns 10042 protruding from the base 10041. Each column 10042 has an eigenvalue of height (H) and angle ($\Theta$). The generated image 1003 formed by the beam polarized by phase plate 10040 may change according to the height (H) and angle ($\Theta$) of each column 10042.

As illustrated on FIG. 17, the phase plate processing unit 10013 may process the structure related to the phase plate 10040 with the data related to height(H) of each column 10042, width(W) and angle ($\Theta$) of each column 10042.

In the illustrated embodiment, the height (H) refers to the height of the column 10042, the width (W) refers to the width or the breadth of the column 10042, and the phase ($\Theta$) refers to the rotation angle in the plane of the column. Further, LCP refers to left-handed circular polarization and RCP refers to right-handed circular polarization.

Furthermore, Ex and Ey refers to a linearly polarized state, and $|Ex|^2$ and $|Ey|^2$ represent normalized intensity.

As mentioned below, the above mentioned data will be stored in the database unit 10020. Hereupon, the phase plate processing unit 10013 is connected to the database unit 10020 and is able to receive the above mentioned data stored in the database unit 10020.

At this time, data related to arrangement method such as the position or the direction of each column may be stored in the database unit 10020. That is, the stored data includes all the data related to the plurality of the beams emitted from the source image 1002.

Therefore, the structure of the phase plate 10040 processed by the phase plate processing unit 10013 includes the data related to the structure corresponding to the plurality of the beams beam which includes the data of a singular source image 1002.

The structural value of the phase plate processed by the phase plate processing unit 10013 is conveyed to the phase plate superposition unit 10014 and is utilized to process the structural superposition value of the phase plate of the beam-generating unit 30 for conversion of a plurality of source image 1002 into a singular generated image 1003. The phase plate processing unit 10013 and the phase plate superposition unit 10014 are connected to each other.

The phase plate superposition unit 10014 superposes the structural value of the phase plate regarding the source image 1002 processed by the phase plate processing unit 10013 and processes the superposition value of the phase plate regarding the plurality of source image 1002.

As mentioned above, the phase plate processing unit 10013 processes the structural value of the phase plate regarding a singular source image 1002. The generated image 1003 formed by the structural value of the phase plate processed by the phase plate processing unit 10013 only includes the data of a singular source image 1002.

Hereupon, the phase plate superposition unit 10014 superposes the structural values of the different source images 1002 processed by the phase plate processing unit 10013 for the plurality of source images 1002 to be included in the generated image 1003.

For this purpose, the phase plate superposition unit 10014 repeats the above mentioned process on the different source images 1002 and is configured to control the Fourier processing unit 10011, the Inverse Fourier processing unit 10012 and the phase plate processing unit 10013 for processing each of the different source images 1002.

Therefore, the phase plate superposition value processed by the phase plate superposition unit 10014 includes the data required for the beam-generating unit 30 to convert a plurality of source images 1002 to a singular generated image 1003.

In specific, the phase plate superposition unit 10014 may control the Fourier processing unit 10011, the Inverse Fourier processing unit 10012 and the phase plate processing unit 10013 to repeat the above mentioned process depending on the number of the selected source images 1002.

Further, the phase plate superposition unit 10014 may process the generated data of a plurality of source images 1002 by superposing each of the amplitude and phase derived from the above process.

At this time, it can be understood that there is included the added value of the phase and lens phase of the above mentioned angular momentum ($\ell$) in the generated data processed by the phase plate superposition unit 10014.

As illustrated in FIG. 18, there can be included the data related to the amplitude (H)(i), phase (Θ)(ii), angular momentum ($\ell$) and FT lens phase (iv) in the phase plate superposition unit 10014. At this time, there is included the different source images 1002 illustrated in each of FIG. 18 (*a*) and FIG. 18 (*b*) in the superposition value processed by the phase plate superposition unit 10014.

That is, there is illustrated in FIG. 18 the conversion process of each of the first image frame to the n image frame. "iFT" illustrated in FIG. 18 indicates inverse Fourier Transform.

In an embodiment, the superposition structural value of the phase plate processed by the phase plate superposition unit 10014 may be expressed in the complex amplitude field value. That is, as illustrated on FIG. 19, the processed superposition structural value of the phase plate may be expressed in amplitude((a) of FIG. 19) and phase((b) of FIG. 19).

As illustrated in FIG. 20 and FIG. 21, the phase plate superposition unit 10014 distinguishes processed phase plate structure superposition value into amplitude (H) and phase (Θ) and may carry out processes related to sections subject to amplitude modification. At this time, the black line horizontally extended in FIGS. 20 and 21 represents the range of the column 10042 subject to amplitude modification.

In an embodiment, the phase plate superposition unit 10014 may carry out the process for verifying the processed phase plate structure superposition value. As illustrated in FIG. 22, the phase plate superposition unit 10014 may digitalize and verify the blazed phase grating of a plurality of columns 10042 processed to have different height at a particular wavelength.

The phase plate superposition unit 10014 may position the processed phase plate structure superposition value using various coordinates system.

The phase plate superposition value processed by the phase plate superposition unit 10014 is conveyed to the beam-generating unit 30, and is utilized as the support data to construct the beam-generating unit 30. The phase plate superposition unit 10014 and the beam-generating unit 30 are connected.

Hereinafter, the processing procedures for the beam which includes the data of the source image 1002 by each component to express the generated image 1003 by each component of the processing unit 10010 will be further explained whilst referring to FIG. 18.

First, the source image 1002 is selected. In FIG. 18, the source image 1002 is labelled as "Image frame". In the selected source image 1002 is included a plurality of data constructing the image.

The Fourier processing unit 10011 processes Fourier transform by multiplying the Dirac comb function and the diffuser array of the beam which includes the data of the selected source image 1002. In FIG. 18, the second plane from the left is the Dirac comb function, and the third plane from the left is the diffuser array.

At this time, there is included in the Dirac comb function a plurality of gratings diverged and positioned side by side. The diameter of the grating and the distance between the plurality of gratings provided in the Dirac comb function may be decided by the number of angular momentum ($\ell$).

The output of multiplication of the Dirac comb function and the diffuser array is Inverse Fourier transformed by the Inverse Fourier processing unit 10012. The amplitude of the angular momentum ($\ell$) and the inverse Fourier Transform phase is obtained from the process above. In FIG. 33, each of the two planes on the right of "iFT" represents the processed amplitude (A) and phase (Θ). (That is, the fourth and the third plane from the left.)

The output value inverse Fourier Transformed is conveyed to the phase plate processing unit 10013. The phase plate processing unit 10013 adds the operator and produces a result that includes all data of a singular source image 1002.

First, when a beam that has a particular angular momentum ($\ell$), among the beams that include the data of the source image 1002, is incident, the phase plate processing unit 10013 adds the helical phase which polarizes the beam with a particular angular momentum ($\ell$) to the above output value.

Further, the phase plate processing unit 10013 adds the phase of the lens which induces the generated image 1003 to be on a particular focus, to the above output value.

Accordingly, the phase plate structure value may be processed.

The phase plate superposition unit 10014 superposes each of the phase plate structure values added by the phase plate processing unit 10013 to the plurality of source images 1002 and processes the phase plate superposition value.

Therefore, the generated image 1003 produced by the phase plate superposition value processed by the phase plate superposition unit 10014, becomes capable of including every data included in the plurality of source images 1002.

The phase plate superposition value processed by the phase plate superposition unit 10014 is conveyed to the beam-generating unit 30.

The above procedures described using equations are as follows.

$$E_1(x,y)=F(E_H(kx,ky))$$ [Equation 1]

At this time, $E_1(x,y)$ of equation 1 represents the distribution of electromagnetic field in the image plane of the beam constructing the source image 2 and can be understood as source image 2.

Further, it is signified that the equation 1 may Fourier Transform $E_H(k_x,k_y)$ into $E_1(x,y)$. $k_x$, $k_y$ are spatial frequencies and $E_H(k_x,k_y)$ represents the phase and the amplitude of a hologram plane comprising of spatial frequency.

$$E_H^{OAM}(k_x,k_y)=E_H(k_x,k_y)e^{i\ell\phi}$$ [Equation 2]

$E_H^{OAM}(k_x,k_y)$ of equation 2 represents the phase and the amplitude with the OAM mode number($\ell$) of the helical phase added to the hologram plane $E_H(k_x,k_y)$ derived from equation 1.

That is, $E_H^{OAM}(k_x,k_y)$ can be derived by multiplying $e^{i\ell\phi}$ by hologram plane $E_H(k_x,k_y)$ derived from equation 1.

$$E_H^{OAM}(x,y)=F(E_H^{OAM}(k_x,k_y))=E_1(x,y)*F(e^{i\ell\phi})$$ Equation 3

$E_H^{OAM}(x,y)$ of equation 3 represents the amplitude and the phase on the hologram plane of the generated image 3 where the data of the source image 2 is presented. As $E_H^{OAM}(x,y)=F(E_H^{OAM}(k_x,k_y))$, Inverse Fourier transforming $E_H^{OAM}(k_x,k_y)$ of equation 2 will derive $E_H^{OAM}(x,y)$.

Further, $E_1(x,y)*F(e^{i\ell\phi})$ represents that $E_1(x,y)$ which includes the data of the source image 2, multiplied by Fourier Transform of $e^{i\ell\phi}$ will derive $E_H^{OAM}(x,y)$ which is the generated image 3.

$$F(e^{il\phi}) = \frac{(-1)^{l+1}k}{f} e^{il\phi} \int_0^R J_l\left(\frac{k}{f} r\rho\right) r\, dr \qquad \text{Equation 4}$$

Meanwhile, $F(e^{il\phi})$ may be displayed as in equation 4. As illustrated on FIG. 4, $F(e^{il\phi})$ may change in figure depending on angular momentum ($\ell$).

Hereupon, the diameter of the grating and the distance between the gratings used for 2D Dirac-comb function may be decided depending on the output value of equation 1 to 4.

Hereupon, the diameter of the grating and the distance between the gratings used for 2D Dirac-comb function may be decided depending on the output value of equation 1 to 4 (refer to FIG. 33).

Above mentioned equation 1 to 2 may be understood as equations for processing the complex amplitude field value of any one of the plurality of beams that represent the data of the source image 1002. That is, in order for the complex amplitude field value of every beam that represent the data of the source image 1002 to be processed, the complex amplitude field value of each beam processed by the above procedure has to be superposed.

The superposition procedure of the of the processed complex amplitude field value each beam may be understood through the following equations 5 to 8.

$$E^{mul} = \Sigma_{j=1}^M A_j e^{i\Theta_j} e^{il_j\phi} \qquad [\text{수식}5]$$

$E^{mul}$ represents the complex amplitude field value of OAM multiplexing hologram. Further, each of $A_j$ and $\theta_j$ represents the amplitude and phase data of angular image channel, and $A_j e^{i\Theta_j} e^{il\phi}$ represents the distribution of the electromagnetic field in the image plane of each beam comprising the source image 2.

Further, each of $l_j$ and $\phi$ represents helical mode index and azimuthal angle, i represents the imaginary symbol which stands for an imaginary number, and M represents the number of multiplexing channels (That is, the total number of images).

Therefore, it can be understood that $E^{mul}$ which is the electromagnetic field incorporating all beams comprising the source image 2, may be processed by superposing all distributions of electromagnetic field in image planes of each of the beams expressed through the above equation.

The output value of the plurality of the beams processed through the complex amplitude field value may be expressed in a Fourier Transform form as in the following equation 4.

$$F(E^{mul}) = \Sigma_{j=1}^M F(A_j) \otimes F(e^{i\Theta_j}) \otimes F(e^{il_j\phi}) \qquad [\text{Equation 6}]$$

Here, F represents Fourier transform operator and $\otimes$ represents each of the operator's superposition of convolution.

As mentioned above, the hologram generating apparatus 1001 according to the embodiment of the present invention processes the complex amplitude field value with the angular momentum ($\ell$) of beam. Therefore, the amplitude (H) and the phase ($\Theta$) of angular momentum ($\ell$) can be incorporated, allowing for a more precise data processing. Further, the accuracy and the resolution of the generated image 1003 produced by emitted beam can also be improved.

Furthermore, as the amplitude of each beam has become individually controllable, the resolution and the quality of the generated image 1003 may be improved.

On the other hand, the equation related to the generated image 1003 is as follows when using only the phase as it was done in the traditional method.

$$P^{mul} = \arg[\Sigma_{j=1}^M e^{i\Theta'_j} e^{il_j\phi}] \qquad [\text{Equation 7}]$$

In the above mentioned equation 7, $\theta'_j$ represents the repeatedly searched phase exclusive hologram regarding each image channel.

Therefore, the Fourier Transform according to the traditional method is processed as follows.

$$F(P^{mul}) = F(\arg[\Sigma_{j=1}^M e^{i\Theta'_j} e^{il_j\phi}]) \qquad [\text{Equation 8}]$$

Therefore, according to equation 8, the amplitude (H) cannot be incorporated when processing a generated image 1003 using the traditional method. Therefore, in the case of generated image 1003 produced through the traditional method, the amplitude (H) data of each beam cannot be incorporated and might decrease the resolution and the quality of the generated image 1003.

On the contrary, as illustrated on FIGS. 15 and 16, the hologram generating apparatus 1001 according to the embodiment of the present invention may process the data for producing the generated image 1003 by obtaining the amplitude (H) and the phase ($\Theta$) from the angular momentum ($\ell$) of the beam.

As known, since the angular momentum ($\ell$) is theoretically infinite, the types of data that may be included in a generated image 1003 may also be infinite.

If referred to FIGS. 24 and 25, the phase plate 10040 is displayed constructed according to the value processed by the processing unit 10010. In the displayed embodiment, there is included the beam-generating unit 30 in the base 10041 and the column 10042.

The base 10041 forms the body of the phase plate 10040. The base 10041 is provided in a plate structure and a plurality of columns 10042 may be connected. In other words, the columns 10042 are extended outward from a side of the base 10041.

In the illustrated embodiment, the base 10041 is provided in a circular plate form structured to have a circular cross-section and a specified height. The shape of the base 10041 is connected to the column 10042 in an arbitrary form configured to project beam for producing generated image 1003 with the beam of the source image 1002.

The base 10041 is constructed in a singular number. That is, in a singular base 10041, data may be stored or the plurality of the beams emitted from the plurality of source images 1002 subject to transform may be incident.

The base 10041 may be constructed with a transparent material. Therefore, the incident beam (B) in the beam-generating unit 30 may pass through the base 10041 and proceed to the column 10042. In an embodiment, the base 10041 may be constructed with silica or alumina.

The base 10041 is in continuum with the column 10042.

The column 10042 where the beam incident to the beam-generating unit 30 and emitted from the source image 1002 is transformed as it penetrates, and emits beam for producing the generated image 1003. The principle of the column 10042 executing the above process may be understood by referring to the above mentioned hologram generation principle.

The column 10042 may be formed in a cylindrical shape. In specific, the one end of the column 10042 in its extended direction, is connected to the base 10041 and is in a shape which the other end in its extended direction is extended in the opposite direction of the base 10041.

In the illustrated embodiment, the column 10042 has a rectangular cross-section, and is in a cylindrical shape which extends in the opposite direction of the base 10041. That the column 10042 may be transformed into various three-dimensional figures such as a polygonal prism, a cylinder or an elliptical cylinder is as described above.

The column 10042 may be formed in a beam-transmissive polymer material. Further, the column 10042 may be formed in a birefringent material configured to individually control the amplitude (H) and the phase (Θ) of the transmitted beam.

A plurality of columns 10042 may be provided. Each of the columns 10042 corresponds to the plurality of the beams is emitted by the plurality of source images 1002 and produce a beam that constructs the generated image 1003.

In an embodiment, the plurality of columns 10042 may be arranged to be spaced apart from each other. The arrangement method of the plurality of columns 10042 may be decided by the phase plate structure superposition value processed by the phase plate superposition unit 10014, or the structural value of the phase plate processed by the phase plate processing unit 10013.

The beam projected by the beam-generating unit 30 is polarized by the phase plate 10040 and produce the generated image 1003. Further, that it is possible to produce the generated image 1003 if there is provided a beam modulator instead of the phase plate 10040 is as mentioned above.

(2) Description of the Database Unit 10020

When referred to FIG. 14 again, there is included the database unit 10020 in the hologram generating apparatus 1001 according to the embodiment shown.

The database unit 10020 provides the supporting data for processing generated data required for the processing unit 10010 to produce the structure of the phase plate 10040, or for the beam modulator to produce the generated image 1003. The above support data stored in the database unit 10020 may be defined as the "reference data".

The database unit 10020 is connected to the processing unit 10010.

As illustrated on FIG. 23, the database unit 10020, when a beam with a particular angular momentum ° C. is projected, may express in the 64 orthogonal coordinates system along with the axis of the length (complex plane regarding angle (Θ) and position related information) phase (Θ) or the amplitude (H) of the column 10042 required for generating a particular image.

At this time, the star-shaped symbol shown in FIG. 23 (*a*) corresponds to the column 10042 in FIG. 23 (*b*).

The database unit 10020 may be provided in an arbitrary structure capable of data input, saving and output. In an embodiment, the database unit 10020 may comprise RAM, ROM, HDD, SSD and SD memory card.

(3) Description of the Beam-Generating Unit 30

The beam-generating unit 30 generates the generated image 1003 with the processed result of the processing unit 10010. At this time, it can be understood that the second beam projected in the beam-generating unit 30 is the beam which is the standard for processing the structure of the phase plate 10040 in the processing unit 10010 and has a particular number of angular momentum(($\ell$) or OAM number).

In the embodiment where the beam-generating unit 30 is provided as the metasurface, the beam-generating unit 30 constructs the metasurface corresponding to the phase plate structure value processed by the processing unit 10010. That is the beam-generating unit 30 constructs the metasurface based on the figure, angle and arrangement of the column 10042 corresponding to the processed phase plate structure vale or the phase plate structure superposition value.

The beam with the particular value of angular momentum ($\ell$), which constructs the source image 1002 is projected on the metasurface. The projected light is polarized and generates the generated image 1003 in which all data of the source image 1002 is included.

Further, in the embodiment in which the beam-generating unit 30 is provided as the beam modulator, the phase plate structure value processed by the processing unit 10010 is applied to the beam-generating unit 30.

The beam with a particular value of angular momentum ($\ell$), which constructs the source image 1002 penetrates the beam modulator and may generate the generated image 1003 which includes all data of the source image 1002.

3. The Hologram Generating Method According to an Embodiment of the Present Invention The hologram generating method may transform the source image 1002 into a generated image 1003 through the above mentioned composition of the hologram generating apparatus 1001. At this time, the generated image 1003 may be generated without quality deterioration or distortion using the angular momentum ($\ell$) of beams emitted from the plurality of source images 1002.

Hereinafter, the hologram generating method will be described in detail with reference to FIGS. 26 to 29.

Referring to FIG. 26, there is included in the hologram generating method according to the displayed embodiment, the step S100 at which the source data of the source image 1002 is conveyed to the processing unit 10010, the step S200 at which the generated data is processed to generate the generated image 1003 which includes the source data using the angular momentum($\ell$) of first beam that represents the source data conveyed to the processing unit 10010, and the step S300 at which the beam-generating unit 30 projects the second beam according to the processed generated data and generate the generated image 1003 in the space.

(1) Description of the Step S100 at which the Source Data of the Source Image 1002 is Conveyed to the Processing Unit 10010

It is the description of the step S100 at which the source data, comprising the data of the source image 1002, is conveyed to the processing unit 10010. At this step S100, the source data may be conveyed to the processing unit 10010 in various forms.

In the embodiment where the source image 1002 is provided in a digital file format, the source image may be in an electrical signal form. At this time, there can be included in the source data the hue, saturation, value and the position.

Through this step S100, the hologram generating apparatus 1001 may obtain the generated image 1003 which is the source data for generating a hologram.

Hereinafter, the present step S100 will be described in detail with reference to FIG. 27.

First, one or more source images 1002 are selected which are subject to transform into a generated image 1003 (S110). At this time, either a singular or a plurality of source images 1002 may be selected.

In particular, the hologram generating method according to the embodiment of the present disclosure is configured to transform a plurality of source images 1002 into a singular generated image 1003 without quality deterioration or distortion. Hereupon, descriptions will be made under the premise that the plurality of source images 1002 are selected.

There is included in the selected source image 1002 various data. That the above data may be defined as the source data is as mentioned.

The source data of the selected source image 1002 is conveyed to the processing unit 10010 (S120). In the embodiment where the source image 1002 is provided in a digital file format, the processing unit 10010 may be connected to an arbitrary storage medium where the source image 1002 is stored.

Alternatively, the source image 1002 may be provided as a model that emits the beam in the physical space. In the above embodiment, the processing unit 10010 may be provided in an arbitrary form to detect the emitted beam (That is, first beam).

(2) Detailed Description of the Step S200 at which the Generated Data is Processed to Generate the Generated Image 1003 which includes the Source Data using the Angular Momentum ($\ell$) of First Beam that Represents the Source Data Conveyed to the Processing Unit 10010.

This is the step S200 at which the generated data which becomes the support data for producing the generated image 1003 comprising source data, is processed by the processing unit 10010 using the angular momentum ($\ell$) of first beam which expresses the source data conveyed from the source image 1002. The processed generated data is conveyed to the beam-generating unit 30 and is used to produce the generated image 1003 comprising the source data.

Hereinafter, the present step will be described in detail with reference to FIG. 28.

First, the Fourier processing unit 10011 processes the value of Fourier Transform using the conveyed source data (S210). In specific, the Fourier processing unit 10011 multiplies the conveyed source data by 2D Dirac-comb function and diffuser array and processes the value of Fourier Transform.

The process of the above step (S210) may be understood with reference to the earlier mentioned FIG. 18.

The Inverse Fourier processing unit 10012 processes the amplitude and the phase by Inverse Fourier Transforming the value of Fourier Transform processed by the Fourier processing unit 10011 (S220). At this time, it can be understood that the amplitude and the phase processed by the Inverse Fourier processing unit 10012 are the amplitude and the phase of the particular angular momentum ($\ell$) of first beam comprising the source data.

As stated above, the processed amplitude and phase may be expressed in Complex Amplitude Field Values.

The amplitude and phase processed by the Inverse Fourier processing unit 10012 is conveyed to the phase plate processing unit 10013.

The phase plate processing unit 10013 processes the generated data to express the processed amplitude and phase in the generated image 1003.

In specific, the phase plate processing unit 10013 adds the phase of the angular momentum ($\ell$) to the processed amplitude and phase (S230). At this time, the above phase is the helical phase of the angular momentum ($\ell$) which restores the source image 1002 when a light of a particular OAM number is incident.

Further, the phase plate processing unit 10013 adds the phase of the lens corresponding to the focal length of space for the generated image 1003 to be created, to the above amplitude and phase with the helical phase added (S240).

That is, the present step (S240) is here the phase of the lens is applied which adjusts to produce the generated image 1003 on a particular focus, in the physical space based on the processed generated image.

The amplitude and phase processed at the present step (S240) are conveyed to the phase plate superposition unit 250.

The phase plate superposition unit 10014 repeats the above steps (S210 to S240) according to the number of the plurality of source images 1002, superposes the obtained plurality of generated data and processes the generated data comprising data identical to that of the plurality of source images 1002.

For this purpose, the phase plate superposition unit 10014 processes the number of selected source images at the step (S110) where the source images 1002 are selected. The phase plate superposition unit 10014 may control the Fourier processing unit 10011, the Inverse Fourier processing unit 10012, and the phase plate processing unit 10013 to process the amplitude and the phase of each of the plurality of source images, by repeating above steps (S210 to S250) according to the number of processed source images (S250).

The plurality of source data representing the plurality of source images 1002, may be individually processed into the plurality of generated data by the above step (S250).

Alternatively, the phase plate superposition unit 10014 may process the amplitude and phase of each of the selected plurality of source images 1002, process the plurality of generated source data by processing the helical phase and lens phase of the angular momentum ($\ell$) individually, and superposes them (S260). The present step (S260) differs from the step (S250) stated above in that the phase plate superposition unit 10014 repeatedly processes the amplitude and phase, and arranges them in a superposition.

Therefore, it can be understood that the procedure of processing and superposition of the plurality of generated data may be carried out by either one of the steps (S250, S260) stated above.

The generated data, which is the amplitude and phase processed and superposed by the phase plate superposition unit 10014, is conveyed to the beam-generating unit 30 (S270). The phase plate superposition unit 10014 and the beam-generating unit 30 are connected to each other.

(3) Detailed Description of the Step S300 at which the Beam-Generating Unit 30 Projects the Second Beam according to the Processed Generated Data and Generate the Generated Image 1003 in the Space.

This is the step at which the beam-generating unit 30 projects the second beam according to the generated data processed by the processing unit 10010 and produce the generated image 1003 in the physical space (S300). Hereinafter, the present step will be described in detailed description with reference to FIG. 29.

As stated above, the beam-generating unit 30 may be provided in a figure for generating generated images 1003 with the metasurface. Alternatively, the beam-generating unit 30 may be provided as a beam modulator and project the second beam comprising the generated data to produce the generated image 1003.

Consequently, the case in which the beam-generating unit 30 uses the metasurface and the case in which the beam-generating unit 30 is provided as a beam modulator will be described separately.

First, the step (S310) at which the beam-generating unit 30 uses the metasurface to generate the generated image 1003 will be described.

The beam-generating unit 30 implements the phase plate 10040 that corresponds to the processed generated data, which is the metasurface with the structure and arrangement of the column 10042 applied to be specific (S311).

A generated image 1003 comprising processed generated data is produced in the space when the beam-generating unit 30 projects the second beam on the implemented metasurface (S312).

Subsequently, the step (S320) at which the beam-generating unit 30 is provided as a beam modulator and produces a generated image 1003, will be described.

When the beam-generating unit 30 is provided as a beam modulator, the beam-generating unit 30 adjusts the amplitude and phase of the second beam according to the processed generated data. The adjusted second beam is projected in the space and is configured to generate the generated image 1003.

At this time, since the source data of the source image 1002 included in the generated data processed by above procedure the source data, it can be understood that the source data is also included in the produced generated image 1003.

4. Description on the Effect of the Hologram Generating Apparatus 1001 and Method of Generating the Same According to the Embodiment of the Present Disclosure As stated above, the hologram generating apparatus 1001 and method of generating the same may transform a source image 1002 into a generated image 1003 using angular momentum ($\ell$).

Alternatively, the hologram generating apparatus 1001 and method of generating the same may use a particular angular momentum($\ell$) of beam to produce a generated image 1003 comprising the data of a source image 1002. In an embodiment, that a generated image 1003 may be a hologram is as stated above.

As the hologram generating apparatus 1001 and method for generating the same according to the embodiment of present invention uses the angular momentum ($\ell$) of the beam, the number of data included in the generated image 1003 may not be limited. That is, the theoretical limit of the angular momentum ($\ell$) of beam is inexistent, the theoretical limit of included in a generated image 1003 too, is inexistent.

Therefore, the hologram generating apparatus 1001 and method for generating the same according to the embodiment of present invention may not only be applied to holograms, but also to telecommunication, holographic videos and forgery prevention technologies due to the variety of data that may be included in the generated image 1003.

Hereinafter, the effects of the hologram generating apparatus 1001 and method for generating the same according to the embodiment of present invention will be described in detail with reference to FIGS. 30 and 31.

Referring to FIG. 30, an example of the generated image 1003 formed by hologram generating apparatus 1001 and method for generating the same according to the embodiment of present invention is illustrated. It is understood that the generated image 1003 according to the illustrated embodiment is the holographic video display presenting a rotating triangle.

Depending on the flow of time and the angular momentum ($\ell$), the direction of the triangle illustrated in the generated image 1003 is shown differently. That is, the generated image 1003 may be expressed in a dynamic image as the plurality of the source images 1002 are transformed and arranged according to the flow of time.

Referring to FIG. 31, there is illustrated another example of a generated image 1003 produced through the hologram generating apparatus 1001 and method for generating the same according to the embodiment of present invention. It can be understood that the generated image 1003 according to the illustrated embodiment is the holographic video display expressing a rotating helical figure.

Depending on the flow of time and the angular momentum ($\ell$), the direction of the helix illustrated in the generated image 1003 is shown differently. That is, the generated image 1003 may be expressed in a dynamic image as the plurality of the source images 1002 are transformed and arranged according to the flow of time.

The earlier described hologram generating apparatus 1001 and method for generating the same according to the embodiment of present invention uses the theoretically unlimited number of beam's angular momentum ($\ell$) to transform a source image 1002 into a generated image 1003.

Therefore, not only the number and the types of data that may be expressed on a generated image 1003 is increased, but also videos that change with the flow of time such as an animated image, may be expressed. Therefore, the practicality of a generated image 1003 may be increased as it has become possible to transform data without quality deterioration or distortion of a generated image 1003.

Furthermore, a generated image 1003 may be produced by a singular beam-generating unit 30. Therefore, the structure of the equipment required to express a variety of data on a generated image 1003 may be simplified.

While until now the present invention has been described with reference to the desirable embodiments, it is understood that a person having ordinary skill in the art may easily change or modify the invention without departing from the technical ideas and the scope of the present invention stated in the claims below.

The following is a list of the above mentioned embodiments.

Item 1 may provide a stimulus-responsive dynamic metaholographic device comprising: a metasurface where a plurality of nanostructures are provided; and a liquid crystal layer provided on one side of the metasurface, comprising a plurality of cells configured to be altered in arrangement by an outer stimulus; and wherein the liquid crystal layer is configured to change polarization state of a transmitted beam penetrating the liquid crystal layer as the plurality of the cells are altered in arrangement by the outer stimulus.

Item 2 may provide a stimulus-responsive dynamic metaholographic device of Item 1, wherein a plurality of nanostructures comprising a nanostructure included in a first nanostructure group, and a nanostructure included in a second nanostructure group, and wherein the nanostructure included in the first nanostructure group and the nanostructures included in the second nanostructure group are arranged orthogonally.

Item 3 may provide a stimulus-responsive dynamic metaholographic device of Item 1 or 2, wherein the nanostructure is provided as hydrogenated amorphous silicon.

Item 4 may provide a stimulus-responsive dynamic metaholographic device of any one of Items 1 to 3, wherein the nanostructure is 120 nm to 250 nm in length and 60 nm to 150 nm in width.

Item 5 may provide a stimulus-responsive dynamic metaholographic device of any one of Items 1 to 4, wherein the plurality of the cells are arranged in one direction when no outer stimulus is applied, and wherein the cells arranged in the one direction are rotated as outer stimulus is applied and rearranged into a different direction from the one direction.

Item 6 may provide a stimulus-responsive dynamic metaholographic device of any one of Items 1 to 5, wherein the liquid crystal layer comprising a first area comprising the plurality of cells arranged in one direction, and a second area in which the cells arranged in the one direction are rotated and arranged in a different direction from the one direction.

Item 7 may provide a stimulus-responsive dynamic meta-holographic device of any one of Items 1 to 6, wherein a transmitted beam becomes a first polarization state when an incident beam enters the first area, and wherein the transmitted beam becomes a second polarization state when an incident beam enters the second area.

Item 8 may provide a stimulus-responsive dynamic meta-holographic device of any one of Items 1 to 7, wherein the cell is provided as 4-Cyano-4'-pentylbiphenyl.

Item 9 may provide a stimulus-responsive dynamic meta-holographic device of any one of Items 1 to 8, wherein the one direction indicates a tangential direction of an upper substrate of a metasurface.

Item 10 may provide a stimulus-responsive dynamic meta-holographic device of any one of Items 1 to 9, wherein in upper part of the liquid crystal layer is provided an upper substrate, and wherein in lower part of the liquid crystal layer is provided a lower substrate, and wherein on one side of the upper substrate and the lower substrate is provided an electrode configured to apply a preset volts alternating current on the liquid crystal layer.

Item 11 may provide a stimulus-responsive dynamic meta-holographic device of any one of Items 1 to 10, wherein in the liquid crystal layer, when an electric field is formed, the cells are rotated in a parallel direction to the electric field.

Item 12 may provide a stimulus-responsive dynamic meta-holographic device of any one of Items 1 to 11, wherein the liquid crystal layer is provided from 5 μm to 15 μm in thickness.

Item 13 may provide a stimulus-responsive dynamic meta-holographic device of any one of Items 1 to 12, wherein in the liquid crystal layer, when volts alternating current is applied, the cells are rotated in a vertical direction to an upper substrate.

Item 14 may provide a stimulus-responsive dynamic meta-holographic device of any one of Items 1 to 13, wherein an incident beam entering the liquid crystal layer is provided as a linearly polarized beam at 45° to one direction in which the cells are arranged in.

Item 15 may provide a stimulus-responsive dynamic meta-holographic device of any one of Items 1 to 14, wherein the outer stimulus is provided as temperature change, and when temperature change occurs in the liquid crystal layer, the cells arranged in one direction are rearranged in a different direction.

Item 16 may provide a stimulus-responsive dynamic meta-holographic device of any one of Items 1 to 15, wherein in the liquid crystal layer is provided a cyanobiphenyl liquid crystal E7.

Item 17 may provide a stimulus-responsive dynamic meta-holographic device of any one of Items 1 to 16, wherein in the liquid crystal layer with a first temperature range enters an incident beam, the transmitted beam represents a first polarization state, and wherein in the liquid crystal layer with a second temperature range enters an incident beam, the transmitted beam represents a second polarization state.

Item 18 may provide a stimulus-responsive dynamic meta-holographic device of any one of Items 1 to 17, wherein the stimulus-responsive dynamic meta-holographic device is comprising a heating layer configured to cause temperature change on at least a part of the liquid crystal layer.

Item 19 may provide a stimulus-responsive dynamic meta-holographic device of any one of Items 1 to 18, in the case of an incident beam penetrating the liquid crystal layer without applied pressure, the transmitted beam represents a second polarization state, and in the case of an incident beam penetrating the liquid crystal layer with a first pressure, the transmitted beam represents a first polarization state.

Item 20 may provide a stimulus-responsive dynamic meta-holographic device of any one of Items 1 to 19, wherein the first pressure is 5 kpa to 20 kpa.

Item 21 may provide a hologram generating apparatus including: a processing unit configured to receive source data of a source image and use angular momentum of a first beam representing the source data to generate data for producing a generated image comprising the source data; and a database unit connected to a processing unit configured to store reference data for processing the generated data; and a beam-generating unit connected to the processing unit forming the generated image by projecting a second beam according to the processed generated data.

Item 22 may provide a hologram generating apparatus of Item 21, wherein the source image is provided as a digital file format.

Item 23 may provide a hologram generating apparatus of Items 21 or 22, wherein the processing unit comprising a Fourier processing unit configured to process value of Fourier Transform by multiplying a 2D Dirac comb function and a diffuser array with the source data.

Item 24 may provide a hologram generating apparatus of any one of Items 21 to 23, wherein the processing unit comprising an Inverse Fourier Processing Unit configured to process amplitude of a source image and Inverse Fourier Transform phase by Inverse Fourier Transforming the value of Fourier Transform.

Item 25 may provide a hologram generating apparatus of any one of Items 21 to 24, wherein the processed amplitude and phase are expressed as complex-amplitude field value.

Item 26 may provide a hologram generating apparatus of any one of Items 21 to 25, wherein the processing unit comprising a phase plate processing unit configured to add phase of the angular momentum to the processed amplitude and phase.

Item 27 may provide a hologram generating apparatus of any one of Items 21 to 26, wherein the phase plate processing unit adds a lens phase corresponding to focal length of space where a generated image is generated, to the amplitude and phase with the phase of the angular momentum added.

Item 28 may provide a hologram generating apparatus of any one of Items 21 to 27, wherein a plurality of the generated images is provided; and wherein in the processing unit comprising a phase plate superposition unit configured to process the amplitude and phase of each of a plurality of source images, and adds and superposes the phase of the angular momentum and the lens phase.

Item 29 may provide a hologram generating apparatus of any one of Items 21 to 28, wherein the beam-generating unit, is created according to the generated data processed by the processing unit; and is provided as a phase plate or a beam modulator formed on a metasurface.

Item 30 may provide a hologram generating apparatus comprising a step (a) in which source data of a source image is conveyed to a processing unit; a step (b) in which the processing unit processes generated data to generate a generated image comprising the source data using angular momentum of a first beam which represents the conveyed source data; and a step (c) in which a beam-generating unit projects a second beam according to the processed generated data and generates the generated image in a space.

Item 31 may provide a hologram generating apparatus of Item 39, wherein the step (a) comprising a step (a1) in which more than one source image is selected.

Item 32 may provide a hologram generating apparatus of any one of Item 30 or 31, wherein the step (b), comprising a step (b1) in which a Fourier processing unit multiplies a 2D Dirac comb function and diffuser array to the source data to process value of Fourier Transform; and a step (b2) in which an Inverse Fourier unit Inverse Fourier Transforms the value of Fourier Transform to process amplitude and phase.

Item 33 may provide a hologram generating apparatus of any one of Items 30 to 32, wherein the processed amplitude and phase are expressed in complex-amplitude field values.

Item 34 may provide a hologram generating apparatus of any one of Items 30 to 33, wherein the step (b) is comprising a step (b3) in which angular momentum is added to the amplitude and phase processed by a phase plate processing unit; and a step (b4) in which the phase plate processing unit further adds focal length of a space for a generated image to be generated, to the amplitude and phase with the angular momentum added.

Item 35 may provide a hologram generating apparatus of any one of Items 30 to 34, wherein the step (b) is provided a plurality of source images, and is comprising a step (b5) in which a phase plate superposition unit processes each of the amplitude and phase of each of the plurality of the source images, and adds and superposes the phase of the angular momentum and the phase of the lens phase.

Item 36 may provide a hologram generating apparatus of any one of Items 30 to 35, wherein in the step (c) is comprising a step (c1) in which when the beam-generating unit is provided as a metasurface, the processed generated data corresponding to a phase plate is implemented as the metasurface; and a step (c2) in which the beam-generating unit projects the second beam on the metasurface to and the generated image is generated in the space.

Item 37 may provide a hologram generating apparatus of any one of Items 30 to 36, wherein in the step (c) is included a step (c3) in which when the beam-generating unit is provided as a beam modulator, the second beam is projected by the beam modulator according to the processed generated data and the generated image is generated in the space.

INDUSTRIAL APPLICABILITY

The embodiments may be used in the stimulus-responsive dynamic meta-holographic device and the hologram generating apparatus which are in the industrial field related to meta materials.

What is claimed is:

1. A hologram generating apparatus comprising:
a processing unit configured to receive source data of a source image and use angular momentum of a first beam representing the source data to generate data for producing a generated image comprising the source data; and
a database unit connected to a processing unit configured to store reference data for processing the generated data; and
a beam-generating unit connected to the processing unit forming the generated image by projecting a second beam according to the processed generated data,
wherein the processing unit comprising a Fourier processing unit configured to process value of Fourier Transform by multiplying a 2D Dirac comb function and a diffuser array with the source data.

2. The hologram generating apparatus of claim 1, wherein the source image is provided as a digital file format.

3. The hologram generating apparatus of claim 1, wherein the processing unit comprising an Inverse Fourier Processing Unit configured to process amplitude of a source image and Inverse Fourier Transform phase by Inverse Fourier Transforming the value of Fourier Transform.

4. The hologram generating apparatus of claim 3, wherein the processed amplitude and phase are expressed as complex-amplitude field value.

5. A hologram generating apparatus of claim 3, wherein the processing unit comprising a phase plate processing unit configured to add phase of the angular momentum to the processed amplitude and phase.

6. The hologram generating apparatus of claim 5, wherein the phase plate processing unit adds a lens phase corresponding to focal length of space where a generated image is generated, to the amplitude and phase with the phase of the angular momentum added.

7. The hologram generating apparatus of claim 6, wherein a plurality of the generated images is provided; and
wherein in the processing unit comprising a phase plate superposition unit configured to process the amplitude and phase of each of a plurality of source images, and adds and superposes the phase of the angular momentum and the lens phase.

8. The hologram generating apparatus of claim 1, wherein the beam-generating unit, is created according to the generated data processed by the processing unit; and
is provided as a phase plate or a beam modulator formed on a metasurface.

9. A hologram generating method comprising:
a step (a) in which source data of a source image is conveyed to a processing unit;
a step (b) in which the processing unit processes generated data to generate a generated image comprising the source data using angular momentum of a first beam which represents the conveyed source data; and
a step (c) in which a beam-generating unit projects a second beam according to the processed generated data and generates the generated image in a space,
wherein the step (b), comprising:
a step (b1) in which a Fourier processing unit multiplies a 2D Dirac comb function and diffuser array to the source data to process value of Fourier Transform; and
a step (b2) in which an Inverse Fourier unit Inverse Fourier Transforms the value of Fourier Transform to process amplitude and phase.

10. The hologram generating method of claim 9, wherein the step (a) comprising a step (a1) in which more than one source image is selected.

11. The hologram generating method of claim 9, wherein the processed amplitude and phase are expressed in complex-amplitude field values.

12. The hologram generating method of claim 9, wherein the step (b) is comprising:
- a step (b3) in which angular momentum is added to the amplitude and phase processed by a phase plate processing unit; and
- a step (b4) in which the phase plate processing unit further adds focal length of a space for a generated image to be generated, to the amplitude and phase with the angular momentum added.

13. The hologram generating method of claim 12, wherein the step (b) is provided a plurality of source images, and is comprising a step (b5) in which a phase plate superposition unit processes each of the amplitude and phase of each of the plurality of the source images, and adds and superposes the phase of the angular momentum and the phase of the lens phase.

14. The hologram generating method of claim 9, wherein in the step (c) is comprising:
- a step (c1) in which when the beam-generating unit is provided as a metasurface, the processed generated data corresponding to a phase plate is implemented as the metasurface; and
- a step (c2) in which the beam-generating unit projects the second beam on the metasurface to and the generated image is generated in the space.

15. The hologram generating method of claim 9, wherein in the step (c) is included:
- a step (c3) in which when the beam-generating unit is provided as a beam modulator, the second beam is projected by the beam modulator according to the processed generated data and the generated image is generated in the space.

* * * * *